United States Patent
Tabe

(10) Patent No.: US 9,163,607 B2
(45) Date of Patent: Oct. 20, 2015

(54) WIND AND HYDROPOWER VESSEL PLANT

(76) Inventor: Joseph Akwo Tabe, Silver Spring, MD (US)

(*) Notice: Subject to any disclaimer, the term of this patent is extended or adjusted under 35 U.S.C. 154(b) by 1308 days.

(21) Appl. No.: 12/383,569

(22) Filed: Mar. 25, 2009

(65) Prior Publication Data
US 2010/0244450 A1 Sep. 30, 2010

(51) Int. Cl.
F03B 13/10 (2006.01)
F03B 13/26 (2006.01)

(52) U.S. Cl.
CPC ..................... F03B 13/262 (2013.01)

(58) Field of Classification Search
USPC .............................. 290/53, 55, 54, 44, 42, 43
See application file for complete search history.

(56) References Cited

U.S. PATENT DOCUMENTS

| | | | | | |
|---|---|---|---|---|---|
| 4,159,427 | A * | 6/1979 | Wiedemann | ..................... | 290/55 |
| 4,316,704 | A * | 2/1982 | Heidt | ............................ | 417/100 |
| 4,546,264 | A * | 10/1985 | Pinson | ............................ | 290/54 |
| 4,606,197 | A * | 8/1986 | Takahashi et al. | ............... | 62/133 |
| 4,864,152 | A * | 9/1989 | Pedersen | ......................... | 290/53 |
| 6,100,600 | A * | 8/2000 | Pflanz | ............................ | 290/54 |
| 6,531,788 | B2 * | 3/2003 | Robson | ........................ | 290/43 |
| 6,652,221 | B1 * | 11/2003 | Praenkel | ........................ | 415/3.1 |
| 6,734,576 | B2 * | 5/2004 | Pacheco | ........................... | 290/55 |
| 6,833,631 | B2 * | 12/2004 | Van Breems | ..................... | 290/42 |
| 7,075,189 | B2 * | 7/2006 | Heronemus et al. | ............ | 290/44 |
| 7,088,012 | B2 * | 8/2006 | Gizara | ............................ | 290/43 |
| 7,242,107 | B1 * | 7/2007 | Dempster | ....................... | 290/55 |
| 7,298,056 | B2 * | 11/2007 | Gizara | ............................ | 290/54 |
| 7,331,762 | B2 * | 2/2008 | Fraenkel | ........................... | 416/85 |
| 7,453,164 | B2 * | 11/2008 | Borden et al. | .................. | 290/42 |
| 7,541,688 | B2 * | 6/2009 | Mackie | ............................ | 290/54 |
| 7,682,126 | B2 * | 3/2010 | Parker | ............................. | 415/3.1 |
| 7,789,723 | B2 * | 9/2010 | Dane et al. | ......................... | 440/6 |
| 8,664,795 | B2 * | 3/2014 | Borden et al. | .................. | 290/55 |

* cited by examiner

*Primary Examiner* — Nicholas Ponomarenko
(74) *Attorney, Agent, or Firm* — Joseph A. Tabe

(57) ABSTRACT

The disclosed embodiments relate to wind and hydropower vessel plant. The vessel plant is configured for generating renewable electrical energy. The wind and hydropower vessel plant comprises apparatus which relates to exposable turbine and/or submersible turbine configuration. Both exposable and submersible turbines are incorporated in a system by reference, comprising a platform for producing renewable electrical energy that is storable and/or transportable. The disclosed embodiments further include a plant for the production of hydrogen, methane, oxygen, desalinated water, salt and supplemental energy.

58 Claims, 16 Drawing Sheets

WIND AND HYDROPOWER VESSEL PLANT

FIELD OF THE EMBODIMENTS

The disclosed embodiments relate to wind and hydropower vessel plant for converting the abundance of ocean energy into electrical energy and for generating transportable energy. In some embodiments, the wind and hydropower vessel plant further comprise apparatus which relates to exposable turbine and/or submersible turbine configuration. In certain embodiments, both turbines are incorporated in a system comprising a platform for producing renewable electrical energy that is stored and/or transported. Further aspects of the disclosed embodiments include production of hydrogen, methane, oxygen, desalinated water, salt and supplemental energy from seawater by running the seawater through a heat exchanger configured with at least a chamber. Each chamber is comprised of at least one of: electrolysis consisting of at least magnesium "Anode" and at least aluminum "Cathode," evaporation, and condenser.

BACKGROUND OF THE EMBODIMENTS

The wind and hydropower vessel plant is disposed in ocean, and is mobile, fixed, and transportable, skid mounted, crane mounted, and is deliverable by a cargo vessel. The vessel plant is disposed in the ocean for converting ocean energies into electrical energy. The vessel plant is configured for producing renewable energy that is transportable to other markets such as offshore plants. In some embodiments or this disclosures, the vessel plant further relate to power output apparatus comprising a wide plan to increase both the overall and the peak demand for renewable energy for distribution within the States. In certain embodiments, the vessel plant is a nuclear energy plant. The current burden for power distribution companies requires developments of specific plans to achieve maximum renewable energy conservation goals that would enable national economic gain.

The Wind and Hydropower vessel plant, in some embodiments, relates to apparatus for generating abundance of renewable energy without creating any environmental impact. The teaching of the disclosed embodiments presents a method that is environmentally friendly. The plant creates no pollution in the air, and it generates no chemical. The vessel plan uses wind and water to generate renewable energy. The generated renewable energy is then used to produce hydrogen, salt, and drinkable water through thermal processes. The plant is a domestic energy source that relies on ocean wind and water cycles to generate renewable electrical energy. Further aspects of the embodiments include producing renewable electrical energy on demand through a continuous water and/or wind flow.

The wind and hydropower vessel plant is configured for converting ocean current, ocean wind, ocean wave, ocean tides, and hydrogen capture into renewable energy. Some embodiments further relates to the awareness of the abundance of ocean energies and the importance of harvesting these energies for the production of renewable electrical energy. Still, some embodiments further include the application of the vessel plant configured with a storage medium. Yet other aspect of the preferred embodiments would educate the public about the importance of these teachings, which include regenerative dams through the vessel responsive to hydropower. Some of the negative consequences of constructed dams would be eliminated through the understanding of the application of the disclosed embodiment. The potential loss of wind and water flow and the natural environment that may be destroyed or diminished from the diversion of wind and water from its natural path to the hydro-generating stations of conventional wind and hydropower plant would be eliminated.

Conventional hydropower plant utilizes embankments which usually are built to reserve water and create differences in water levels. Lakes in high altitudes are also used for the same purposes (the storage of potential energy within the water as the "fuel" for power generation). Five factors are usually used to determine the kind of dam to be built, this include:

the height of water to be stored,
the shape and size of the valley,
the geology of the valley walls and floor,
the availability, quality and cost of construction materials, and
The availability and cost of labor and machinery.

Power stations that contain turbines and generators are usually built near the downstream side of the dam. Pipes or channels are used to direct water from the storage to the stations. Within the station, water pushes the turbine that generates electrical energy and then exits through the tailrace. These processes have existed for long and new researches are needed for the development of transportable power plant configured with regenerative hydropower.

Although current conventional Wind and Hydropower plants have many advantages, there are still quite a few setbacks. The increase of water level could destroy the habitat for humans and other species' by flooding of lands. Additionally, flooding also causes soil erosion on the watershed's wall. This could impact the vegetation of the area. Along with the disruption of natural orders, flooding also could threaten historical landmarks found alongside the river systems. Moreover, building a hydro dam proximate to any city is a potential time bomb for that city if located downstream. Historically, conventional hydropower plants impact water quality and may cause low dissolved oxygen levels in the water. With current conventional hydropower plants, maintaining minimum flow of water downstream is critical for the survival of riparian habitats. Electricity from these plants could not be produced when the water is unavailable. Additionally, humans, flora, and fauna may lose their natural habitats.

Additionally, there are costs and considerations associated with constructing a hydro electric dam, this include:

1. A dammed river, which means that a valley must be flooded. This may have an effect on erosion and may cause loss of habitat to local wildlife. Farmland may also be lost.
2. Special slipways for Hydro electric dams to prevent fish from being swept into the works
3. In areas with unreliable rainfall for obvious reasons.
4. A lot of energy needs to go into the construction of the dam and turbines.
5. Directing a lot of expensive energy into the construction of Dams.

Conventional wind and hydropower also have some benefits for the environment and for the people, such as:

The wind and water is a safe habitat for aquatic life and for wading birds
The dam also provides a source of wind and water for wildlife and farm animals in the surrounding area.
The artificial lake created by the dam has some tourism spin-offs for the local community—boating and fishing in particular (sometimes, the outflow wind and waters from the dam are warmer and fish thrive in them—The lakes can also be used for fish farms.

The power generated by this means is very clean and it produces no carbon emissions.

Overall, this an effective medium for producing renewable energy but due to the reasons discussed above, such as the social, economic and environmental costs, it may be feasible for use in some towns and unfeasible for use in other towns. The vessel plant would supplement conventional wind and hydropower plant The disclosed embodiments are required for States with constant environmental emergencies. The vessel plant would be contributed for transportable renewable energies. The disclosed embodiments present a new educational literature for transportable energies to add to the number of other existing programs to teach ways to expedite the supply of renewable energy and reduce U.S. dependence on foreign oil. Investment in wind and hydropower technology to convert ocean current, ocean wind, ocean wave, and also capture hydrogen from the ocean worth building a plant on a vessel to facilitate the capture and processes. The vessel for the wind and hydropower plant would enable the study and installation of emergency transmission lines "Smart Lines" in all residential, industrial, and other construction areas.

Further application of the wind and hydropower plan in some embodiments, includes distribution from the vessel plant that would require Conservation & Demand Side Management Plan for emergency states. Wind and Hydropower vessel plant, in certain embodiments, include the generation of electrical energy through wind and water pressure. The preferred embodiments of this disclosure comprise of apparatus, which relates to wind and hydropower vessel plant for generating transportable energy. Some of the disclosed embodiments further relate to wind and hydropower vessel plant comprising exposable turbine and/or submersible turbine configuration, both incorporated in the preferred embodiment for producing renewable electrical energy that could be stored and/or be transported on demand.

SUMMARY OF THE DISCLOSED EMBODIMENT

Renewable Energy projects are now needed to address emission reduction. One of the more successful approaches to renewable energy is seen in U.S. Pat. No. 7,271,720 designed to supplement electricity on the power grid. Conventional wind mills have problems which need to be worked out. These include land leasing and other environmental concerns. Environmentally, conventional wind mills suffer from location restrictions due to view obstructions, real estate costs, low average wind speed restrictions or bird flyway endangerment. Although the conventional wind mill is cleaner and renewable, these devices also suffer from lack of operational cooperation between wind and grid loads. Additionally, maximum wind force to maximize the electrical grid needs more collaboration at the same time.

Furthermore, some of the better land based wind sites are further away from existing power transmission lines. Again, the issues of land ownership and the problems of environmental impact on wildlife are both large problems to existing conventional wind turbine systems. Other facts include the many land based sites which simply lack the needed average wind speeds to make significant contributions to the growing power needs. While other wave energy capture devices may be under construction, most will meet minimal success to massive energy production. This may include the complexity of surface wave motion. Though the water in the wave zone tends to move as a rolling surging group, the differential capture of this energy contained within would be difficult without the used of an energy vessel plant.

According to the Natural Gas Supply Association, the increasing use of fuel powered vehicles is significantly contributing to environmental pollution, environmental noise, as well as pollution from the refining of crude oil.

For many decades, constant emission of greenhouse gases has exceeded the atmosphere's capacity to safely absorb them. These have resulted in climate crises which must be solved now, and getting the right solution for the climate crises problems require a technological breakthrough that is cleaner and environmentally friendly. The technological breakthrough must produce electrical energy that can be stored and should be transportable. According to U.S. Department of Energy, the energy challenge our country faces are severe and have gone unaddressed for far too long.

The severity of the challenges has been experienced with the conventional electrical energy plants. Conventional electrical energy plants have their pitfalls. For example, using coal for electrification is not infinite and can only provide temporal relief from the world's long term electrification problems. Additionally, the combustion of coal generates carbon dioxides (Greenhouse gas) sulfur oxides, nitrogen oxides, and mercury compounds. Although emission control devices mitigate the air pollution when properly employed in the United State, other countries have failed to use these devices. There is a long lasting scar on landscape from coal mining and these can result in runoff of toxic substances such as lead, mercury, and arsenic. Also, the water used in the boiler of a coal fired power plant accumulates pollutants and when the water is replaced the pollutant must be safely disposed, which increases the cost of operation.

America must commit to producing 100 percent of our electricity from renewable energy and other clean sources within ten years. [Al Gore, Jul. 17, 2008]. There is abundance of clean energy sources at the ocean that could be exploited and transported for commercial applications. The energy sources are renewable and the generated energy could be stored and transported for later use. The embodiments as disclosed further relate to apparatus for harnessing the abundance of ocean energy sources to produce 100 percent renewable energy.

The production of this 100 percent renewable energy would not require oil electrification because fuel combustion produces air and water pollutants similar to coal. Though emission control systems have helped to reduce the pollution, they still need to be kept in proper working order to avoid massive greenhouse gas. Besides, the price of fuel oil is directly related to the price of crude oil. This price may take a sudden rise over a long period of time. Additionally, much of the world's crude oil comes from politically unstable parts of the world, presenting a risk factor which may be ongoing. This may present sudden and unpredictable supply disruption. However, other factors include temporal reduction in oil supply due to natural events such as hurricanes, earthquakes, and pipeline corrosion. The transport of crude oil by ship, rail, and truck also consumes energy, thereby reducing the efficiency of the whole process. In whole, oil is finite and non renewable.

In the near future we will launch a plan for replacing oil with solar energy for routine travel without resorting to tragedy of trashing our soils and water reserves for the sake of hopeless inadequate biofuels production. [Al Gore, Jul. 17, 2008]

The production of biogas by composting can produce objectionable odors. Regarding methane for electrification, any leakage into the air would result into explosive. Price spike and supply disruptions have marred its reliability. Methane is also finite and nonrenewable. The exploration for natural gas and its recovery process can adversely impact the environment by causing erosion, accelerating runoff, and increasing mudslide and flood risk.

U.S. would need to work towards oil independence at least by increasing the viability and deployment of renewable energy technologies, increase energy efficiency, and through the enhancement of U.S. energy security. Globalization and corporate downsizing has taken hold of U.S. economy, and offshore outsourcing and productivity has reflected recent trends in industrial practices. These practices are causing hardships and manufacturing jobs are also disappearing as a result. To reverse the effects these have put on our economy, investment in the influx of new technologies would need to be encouraged through innovative technologies.

According to Changing World Technologies Inc., "The world's energy supply is dwindling. Demand is increasing. In the coming years, oil rich countries will be in a position to put a stranglehold on energy-starved nations. The global economy will shift. Power struggles will ensue. It is imperative that new energy sources be explored and implemented quickly. The United States alone uses approximately 21 million barrels of oil per day or 7.7 billion barrels of oil per year. Imports provide 12 million barrel per day or approximately 4.5 billions of oil per year. These imports currently represent 58% of domestic use." The United State is entering a lone struggle to retain world leadership in science and technology. It is paramount that both government and corporate America invest in our national talent and encourage research and development in areas of new innovative technologies in renewable energy.

The further embodiments as disclosed comprises apparatus comprising a storage medium configured with electrode materials having high surface areas and chemical stability. Some embodiment of the disclosed apparatus comprises ultra-capacitor configured for gaining much higher voltages. Yet in other embodiment, the cells for the ultra-capacitor are stacked in series and further include multiple capacitor cells. In some embodiment, the ultra-capacitor is configured for use with the vessel plant as energy storage medium. In other embodiment, the ultra-capacitor is configured as automotive energy storage medium. The further advantage of the disclosed embodiment includes the following:

Ultra-capacitor is safe and environmentally friendly

Ultra-capacitor contains no toxic chemical.

Ultra-capacitor contains no material that makes charging and disposal hazardous.

Asymmetrical nickel/carbon design in ultra-capacitor is recyclable and reclaimable.

Excellent in high power capabilities and excels in high power supply.

Ultra-capacitor has wider operating temperature range and stores energy electrostatically.

Ultra-capacitor supplies energy even at lower temperature and is easily recharged.

It is apparent that the ocean energy sources as disclosed in the preferred embodiments are within the 70% of the earth's surfaces that are covered by ocean. There exists abundance of energy there due to solar heating and stresses caused by wind. The wind and hydropower vessel plant is a mobile renewable energy system on a vessel configured to harness the vast abundance of energy to meet the requirement of the world's energy and to reduce U.S. dependence on foreign oil. According to Department Of Energy, our addiction to foreign oil doesn't just undermine our national security and wreak havoc on our environment it cripples our economy and strains the budgets of working families all across America. In some embodiment, the apparatus further relates to the wind and hydropower vessel plant. Further aspects of the preferred embodiments would strengthen our national security, our economy, and ease the budgets of working families.

Further embodiments of the disclosed apparatus include applications necessary to harness the abundance of ocean energy through a vessel plant to prepare U.S. for oil independence. In some embodiments, further applications of the disclosed apparatus would enable restoration of U.S. economy and relieve working families from their current budget strains. U.S. addictions to foreign oil would be slowed and U.S. national security would be strengthened. The vessel plant is transportable and further embodiments of the disclosed apparatus relate to an effective and efficient way of generating electrical energy from the abundance of ocean energies. Still in some embodiments, the apparatus further teaches an effective energy generating system to be transmitted to energy transmission lines or grids.

The apparatus includes, in some embodiments, a vessel energy plant configured for harnessing the abundance of ocean energies and converting the energies into renewable electrical energy. In certain embodiments, the renewable electrical energy is transmitted to transmission lines or grids. These and some embodiments herein describe apparatus for harnessing, including the conversion of:

1. Ocean wind energy.
2. Tidal energy.
3. Thermal energy.
4. Sea water to hydrogen.
5. Wave energy.
6. Ocean current.
7. Seawater to desalinated water. And
8. Salt Yet, further embodiments of the disclosure include pumping sea water into a heat sink. In some embodiments, the heat sink comprises a heat exchanger. Some embodiment of the disclosure provides a thermal energy source operatively configured with the generated renewable electrical energy source. In some embodiments, the thermal energy source is empowered with electrical from the generated renewable energy. In certain embodiment, evaporation is enabled by the thermal energy source. Some embodiments herein describe an evaporation apparatus whereby vapor is channeled other aspect of the disclosed embodiments. In other embodiments herein describe a condenser apparatus for condensing the vapor. Yet, in some embodiments herein describe an apparatus for converting the vapor pressure into renewable electrical energy. In these teachings, the heated sea water is further condensed and water vapor is produced during the condensation process. In certain embodiment, the apparatus further includes a device for isolating the distillate to produce pure drinkable water. In some embodiments, the apparatus further includes at least a turbine. Some embodiments herein describe a device through which steamed vapor is directed to operate at least a turbine. In certain embodiments, the turbine generates renewable electrical energy, such that the electrical energy lost to thermal energy is regained as supplemental renewable energy. In these embodiments, the apparatus is further utilized as a supplemental energy source. Yet, in some embodiment, the apparatus further comprises a heat engine configured for generating hydrogen, desalinated water, oxygen, salt and electrical energy through a method similar to heat exchanger on a vessel plant. In some embodiments, the vessel plant herein describes at least a platform array. In certain embodiments, the platform array further comprises a hydrogen production m device.

The wind and hydropower vessel plant is configured to produce renewable energy through various innovative methods that would not pollute the environment and/or the air. According to Changing World Technologies, Inc. "The earth is not only getting dirtier, but warmer as well. In fact, the rate of global warming during the past twenty years was eight times greater than that of the past one hundred years." The wind and hydropower vessel plant is an innovative method for generating renewable energy. Some embodiments of the disclosure further include devices configured for reducing the rate at which the earth is getting dirtier and warmer.

This rate of increase could be reduced if new renewable energy technologies and methods are implemented that would enable energy to be generated away from land. In some embodiments, a wind and hydropower vessel plant is disclosed. In certain embodiments, the vessel plant further comprises apparatus for generating electrical energy, hydrogen, desalinated water, salt, and other supplemental energy without polluting the environment. The use of a vessel plant was first described in U.S. Pat. No. 7.271,720 "By Joseph A. Tabe, The Author." This disclosure is a continuation in part application of U.S. Pat. No. 7,271,720. The further developments of aspect of the disclosed embodiments comprise a platform operatively configured as a major source of renewable energy plant on a vessel. In certain embodiments, the vessel could be transportable, fixed, mobile, or submersible. The plant is built on the vessel such that renewable energy is generated through wind and hydropower. The renewable energy could be generated on demand and is transportable for emergency applications such as hurricane Katrina and hurricane Ike. The vessel could also be transported to other States requiring environmental emergency assistance. In some embodiments, the vessel plant is configured to be transported for international emergency assistance, such as refugee camps and other emergencies within specified States and or cities.

Further embodiments of the disclosure include apparatus configured for the production of hydrogen specifically by using sea water and renewable energy. Still in certain embodiments, the apparatus further include a controller responsive to peak period for delivering energy through storage medium and/or energy cells to transmission lines and/or grids.

The wind and hydropower vessel plant is configured for harnessing the abundance of ocean energy and for generating hydrogen, oxygen, desalinated water, salt, and additional supplemental energy. The uniqueness of the vessel plant present many opportunities for the abundance of the ocean energy sources. These energy sources are reliable, predictable, renewable, viable, and non-polluting. The "fuel" to propel the vessel may include electrical energy and or electrical/internal combustion engine. The plant is Wind and Hydropower on a vessel, and the energy generated is renewable and cheap. The only costs of the Wind and Hydropower are the expenses for building and maintaining the power stations on the vessels. There are no costs for fuel or the transportation of such. The energy generating process is also environmentally friendly because it does not create any pollution in the air, or generate any chemical, wind and water or thermal pollution. The energy plant is fueled by water and does not pollute the air. The wind and hydropower vessel plant is a domestic energy source that relies on wind and water cycles. The electricity could be produced on demand. The water flow is continuous and the energy conversion method is nonpolluting.

Some embodiments herein describe an apparatus configured with at least a flanged wheel. In some embodiments, wind and/or water flow over the flanged wheel and turn the wheel. The wheel is operatively configured with a generator such that the rotation of the wheel induces current in a magnetic coil. The wind and water current has to flow fairly fast to make the turbine spin at sufficient speed to be able to generate enough electrical energy. In certain embodiments, the apparatus is a wind and hydropower vessel. In other embodiments the apparatus is operatively configured for producing energy. Yet, in some embodiments, the energy is "clean" with no emissions or use of unsustainable resources. Some embodiments herein describe an apparatus for generating renewable electrical energy which is and transportable and which could be generated on demand.

Other aspect of some embodiments herein describe an apparatus operatively configured for converting the ocean current, waves, tides, and wind into electrical energy. Yet, in these and other embodiments, the apparatus further comprises wind and hydropower on a vessel. In some embodiments, vessel is a floatation device disposed on ocean. In some embodiments, the vessel is configured with at least a submersible gearbox configured with sluice gates that could be opened to allow wave and water to flow through. In some embodiments, the speed of the gear in the gearbox is responsive to the ocean current. In some embodiments, the speed of the gear in the gearbox is responsive to the flow force of the wave. In certain embodiments, a shaft is operatively connected to the gearbox. In some embodiments, the gearbox is operationally configured with a turbine. In some embodiments, the turbine is communicatively connected to a generator. Still in some embodiments, the vessel is further configured with wings responsive to low flow force of the ocean. Yet, some embodiments herein describe a regenerative hydropower apparatus for generating renewable electrical energy. In some embodiments, the regenerative hydropower apparatus comprises self propulsion, supplementing areas of the ocean with low flow force.

In some embodiments, the apparatus is propelled by either an electrical motor or electrical/internal combustion engine. In other embodiments, the hydropower is regenerated when the vessel engages in motion. Still in other embodiments, the apparatus is configured with at least a turbine. Yet, in these regard at least one turbine is operated by the flow force of the ocean current. Some embodiments herein describe a device responsive to low current or wind force. In certain embodiments, the low current is compensated for by engaging the vessel in motion. In some embodiments, the disclosed apparatus is responsive to drag force created as the vessel is motioned. Still, in some embodiments, the apparatus is a submersible wing. The drag force is responsive to further movement of the vessel. Some embodiments herein describe an apparatus for creating regenerative energy.

In certain embodiments, the wind and hydropower vessel plant further comprises an apparatus configured for producing renewable energy. The energy is transportable to other markets such as offshore plants. In some embodiments apparatus comprises a platform array. In certain embodiments, the platform array is an electrical power source further comprising a wide plan for increasing both the overall and the peak demand for renewable energy. Yet, in other embodiments, the energy could be distributed within the States. The current burden for power distribution companies requires development of specific plans to achieve maximum renewable energy conservation goals that would enable national economic gain.

Some embodiments herein describe an apparatus operatively configured for energy conservation and demand management. Further advantages of the disclosed embodiments include:

Energy efficiency;
Behavioral and operational changes;

Environmental safety;
Oil independence
Transportable energy for emergency response.

The disclosed embodiments are responsive to wind and hydropower for producing renewable energy through the natural energies that are available within the ocean. Further application of the wind and hydropower vessel plant would reduce U.S. dependence on foreign oil. Other embodiment of the preferred embodiments include a renewable energy system that is transportable, submersible, fixed, mobile, environmentally friendly, and which produce energy on demand. The renewable energy from the energy sources as disclosed in the preferred embodiments comprise of safe and effective method of producing electrical energy from solar and ocean energy sources. Some embodiments herein describe an apparatus for producing hydrogen from sea water, desalinated water from the sea, salt, and further comprise of supplemental renewable energy source through evaporation process.

The wind and hydropower vessel plant is self-sustainable and would not exist solely as a result, but as duration of direct economic subsidies for States renewable energy goals and foreign oil independence. In some embodiments, the wind and hydropower vessel plant comprises at least an infrastructure for enabling long-term sustainable and measurable renewable energy conservation. In certain embodiments, the infrastructure further comprises energy management.

In other embodiments, the apparatus of the disclosed embodiments include at least the wind and hydropower vessel plant. The wind and hydropower vessel plant further comprises a platform comprising at least one of: a submersible array, a transportable array, a fixed array, a mobile array, a platform array, and a crane array. Further advantages of the preferred embodiments would maximize benefit as follows:
Would increase energy efficiency.
Would reduce the environmental impact of electrical energy production.
Would lower the cost of consumer electrical energy.
Would reduce United States dependence on foreign oil.
Would present an effective transportable renewable electrical energy which would provide State Wide outsourcing during environmental emergencies.

The wind and hydropower vessel plant is operatively configured for converting ocean current, ocean wind, ocean wave, ocean tidal, and hydrogen capture into renewable energy. In some embodiments, the apparatus as described include teachings that would raise the awareness of and the importance of renewable energy conservation and would encourage global behavioral change. In other embodiments, the apparatus as disclosed would educate the public about the various arrays, including the importance of regenerative dams on the vessel responsive to hydropower. In other embodiments, the apparatus as described teaches different ways to eliminate some of the negative consequences of constructed dams. The potential loss of wind and water flow and the natural environment that may be destroyed or diminished from the diversion of wind and water from its natural path to the hydro-generating stations as seen in conventional dams is eliminated in certain embodiment of this disclosure. In some instances of conventional dams, the development of the hydro stations can actually stop the river and cease its existence. This is seen quite a bit especially in areas that have limited water that naturally occurs. Some embodiments herein describe a wind and hydropower vessel plant wherein further instances would not develop.

Other benefits of the preferred embodiments include the low cost of power generation since the wind and water are what would do the work. The development of the energy generating station on the vessel initially may be as costly as building a dam. Further embodiments of these disclosures include applications that are more beneficial for the environment and for the public. The wind and hydropower vessel plant would produce renewable electrical energy, hydrogen, desalinated water, oxygen, salt, and methane The production process would not encounter natural emergencies of the habitats of the cities or States as seen with conventional dams.

In some embodiments, the apparatus as described include a wind and hydropower vessel plant on a skid for operations in strategic locations. The vessel plant transportable and mobile applications would present future economic attractions to neighboring States, cities, and countries. The wind and hydropower vessel plant is environmentally friendly and emits zero percent emission to produce further alternative renewable energy. In other embodiments, the apparatus as disclosed further comprises wind turbines on platform arrays, each array unit installed at adjustable height to enable maximum exposure to the abundance of ocean energy.

Current hydropower plants obtain energy from the energy contained in falling waters, though renewable. However, further embodiments of the disclosure of the wind and hydropower vessel plant would comparatively produce nonpolluting renewable energy by using content of moving waters to operate the disclosures of the apparatus, including waterwheels, rotors, blades, gears, and generators. Further embodiments herein describe the apparatus operatively configured within the embodiment of the platform array comprising at least a turbine structure. Some embodiments of the platform arrays include turbines responsive to relative motion against the vessel's movement. In certain embodiments, the turbine structure is responsive to the kinetic energy which is created as a result of ocean energy. In some embodiments, the turbine structure is responsive to the kinetic energy which is created as a result of the wind energy. Some embodiments herein describe a device for enabling the rotational force of the wheel to create a mechanical energy. In certain embodiments of the disclosure, the mechanical energy is then converted into electrical energy through an electrical generator. Further advantage of the embodiments of the platform arrays is that, the operation of the wind and hydropower vessel plant is not limited by the capacity of the conventional generating station.

The disclosure of wind and hydropower vessel plant presents a flexible and useful innovative approach for developing sustainable energy conservation alternatives to maximize energy production. The wind and hydropower vessel plant is required for States with constant environmental emergencies. The vessel plant would contribute to renewable energy production, hydrogen production, drinkable water production, salt production, methane production, and oxygen production. In some embodiments, the disclosure of the vessel plant would enable the development of new educational literature for transportable energies and for producing energies on demand. The disclosure of the preferred embodiments would add to the number of other existing energy programs to expedite the supply of renewable energy to reduce U.S. dependence on foreign oil. Investment in wind and hydropower technology for converting ocean current, ocean wind, ocean wave, and also capture hydrogen, oxygen, salt, methane, and desalinated water from the ocean worth building a plant on a vessel to facilitate these captures and processes. Further development of the vessel for the wind and hydropower plant would enable the study and installation of emergency transmission lines "Smart Lines" in all residential, industrial, and other construction areas. The smart lines would present good appreciations for the opportunities as well as the challenges that need to be overcome during environmental emergencies.

The wind and hydropower distribution from the vessel plant would require further Energy Conservation & Demand Side Management Plan for emergency states.

The wind and hydropower vessel plant presents a continuous assess to the abundance of ocean energy for generating renewable electrical energy that is transportable and which could be produced on demand. The disclosed embodiments further presents new opportunities for producing renewable energy through ocean current, ocean wind, ocean wave, and tidal energy. Some embodiments herein describe an apparatus for producing hydrogen, which could also be converted into renewable energy. In certain embodiments, the apparatus further comprises a device for producing desalinated water. In some embodiments, the apparatus further produces salt. Yet in other embodiments, the apparatus include a device for producing methane. Still in some embodiments, the apparatus further include a device for producing oxygen. Yet in these preferred embodiments, the apparatus further comprises means for producing electrical energy, hydrogen, salt, methane, and desalinated water. Further disclosure of the preferred embodiments teaches an apparatus for producing energy on demand. These disclosures further teach the advantages of certain aspects of the preferred embodiments. These advantages further include transportable energy plant, renewable energy plant, producing energy on demand, mobile energy plant for distribution to transmission lines or grids, emergency mobile and/or transportable plant for States undergoing environmental disasters or energy emergencies.

DETAILED DESCRIPTION OF THE INVENTION

Figure 2:
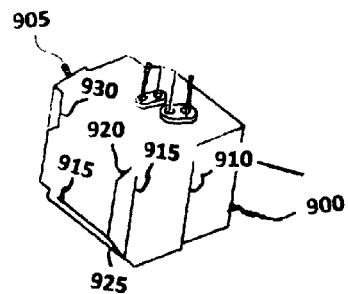
FIG. 2 is an exemplary description of the preferred embodiments comprising ultra capacitor storage medium configured with the vessel plant.

The preferred embodiments include an apparatus for harnessing the abundance of ocean energies and for converting the energies into renewable electrical energy. Some embodiments described below relates to tidal energy, ocean current, wind energy wave energy, and solar energy. For example, in some embodiments, the apparatus as described comprises a platform. In some embodiments, the apparatus as described comprises platform array. In certain embodiments, the apparatus as described comprises a fixed platform array. In other embodiments, the apparatus as described comprises a mobile platform array. Still in some embodiments, the apparatus as described comprises a submersible platform array. Yet in other embodiment, the apparatus as described comprises a transportable platform array. In some embodiments, the apparatus as described is skid mounted. In some embodiments, the apparatus as described is crane mounted. Still in certain embodiments, the apparatus as described is mounted on a cargo vessel.

In some embodiments, the apparatus as described comprises a supplemental crane array. Some embodiments herein describe a device for loading and offloading. In some embodiments, the device for loading and offloading is vessel mounted. In other embodiments, the device for loading and offloading comprise a crane. In some embodiments of the disclosure, the wind and hydropower vessel plant is utilized, but ocean energy sources are the sole energy sources used for generating renewable electrical energy. The terminology used herein is for the purpose of describing particular embodiments only and is not intended to be limiting of the preferred embodiments. As used herein, the singular forms "a", "an", "at least", "each", "one of", and "the" are intended to include the plural forms as well, unless the context clearly indicates otherwise.

It will be further understood that the terms "include", "includes" and/or "including", where used in this specification, specify the presence of stated features, integers, steps, operations, elements, and/or components, but do not preclude the presence or addition of one or more other features, integers, steps, operations, elements, components, and/or groups thereof. In describing example embodiments as illustrated in the drawings, specific terminology is employed for the sake of clarity. However, the disclosure of this patent specification is not intended to be limited to the specific terminology so selected and it is to be understood that each specific element includes all technical equivalents that operate and/or function in a similar manner. It will be further noted that some embodiments of the wind and hydropower vessel plant is used concomitantly and/or not used concomitantly with solar energy. This is rather than using the solar and the solar ray reflection against the surface of the ocean as radiation energy. In some embodiments, the vessel plant comprises a platform array responsive to solar energy. In some embodiments, the wind and hydropower vessel plant further comprise of a platform array responsive to solar energy radiation. In certain embodiments, the platform array further comprise of devices for harnessing ocean energy and solar energy. Other embodiments herein describe apparatus configured for producing renewable electrical energy, hydrogen, methane, oxygen, desalinated water, and salt.

Referencing the drawings, wherein reference numerals designate identical or corresponding parts throughout the several views, example embodiments of the present patent application are hereafter described. The numbers refer to elements of some embodiments of the disclosure throughout. As used herein, the terms "and/or" and "at least one of" include any and all combinations of one or more of the associated listed items.

Figure 1:
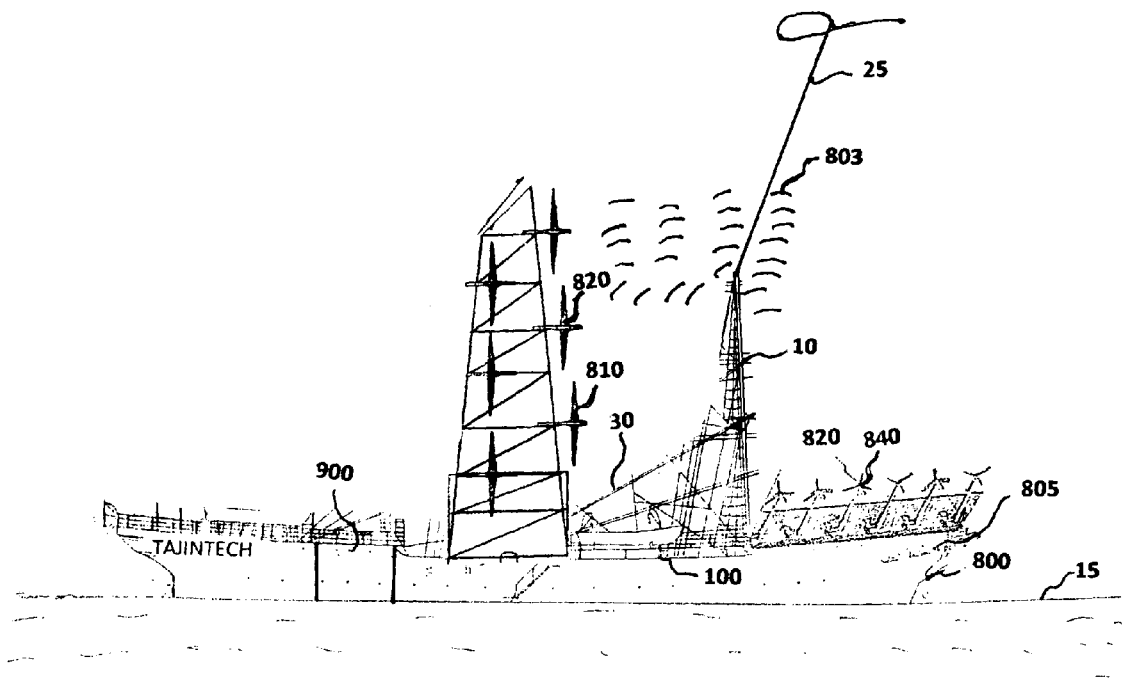
FIG. 1 an exemplary description of a vessel configured with the vessel plant comprising wind mills, grids, and transmission lines. The vessel plant is seen disposed on the ocean.

Referring to FIG. 1 is seen some exemplary embodiments of the apparatus comprising wind and hydropower vessel plant 10 operatively configured with turbines 810 and 840. The turbines 810 and 840 are operatively connected to a generator 820 configured to generate electrical energy. The electrical energy is a renewable and the vessel plant is a renewable energy plant configured to overcome several of the disadvantages of conventional wind and hydropower turbines. The renewable energy 130 is generated through ocean wind 803 and from the abundance of ocean energy. In certain embodiments of the disclosure, the renewable energy is generated through regenerative hydropower on a vessel 800. Other embodiments of the vessel include submersible apparatus and floatable apparatus. In some embodiments, the apparatus is a mobile device. In certain embodiments, the apparatus is a fixed device. Yet in other embodiments, the apparatus is transportable. Still in some embodiments, the apparatus is skid mounted. Yet, in certain embodiments, the apparatus is crane mounted. In other embodiments, the apparatus is vessel mounted. In some embodiments, further disclosure of the vessel configuration includes at least a crane. The vessel 800 may be positioned anywhere in vast ocean areas 15, where it does not obstruct shore views or endanger migratory birds or land based animals. The vessel 800 significantly takes advantage of higher average ocean wind speeds 803. The wind and hydropower vessel plant 10 further produces hydrogen 100 to be transported for later use. The generated electrical energy by the vessel plant 10 could be transported through transmission lines 25 or be offloaded to grids 30. The vessel plant 10 comprises electrical energy storage medium 805, including ultra-capacitor 900.

Referring to FIG. 2 is seen further exemplary embodiments of the apparatus comprising ultra-capacitor-storage medium 900 for the vessel plant 10. The ultra-capacitor 900 further comprises ferroelectric polymer 905 to enable more rapid power delivery, and is much lighter than conventional batteries. The ultra-capacitor 900 further comprises power density tunable polymers 910 and polymer ceramic nano-composites 915 for electric storage materials. In some embodiments, the ceramics and/or glasses are structurally configured to exhibit higher permittivity. In certain embodiments, the disclosure includes combining polymers with materials that have high breakdown strength such as glass 920 or ceramics of high permittivity. Yet in some embodiments, the combinations are further disposed to produce a composite material with a large energy storage capacity for the vessel plant 10. In the disclosed teachings, the higher the breakdown strength, the better the material would enable the ultra-capacitor 900 to exhibit its efficient energy output. In other embodiments, a dielectric silicon dioxide layer 925 is disclosed comprising of dielectric polymers 930.

Figure 3B:
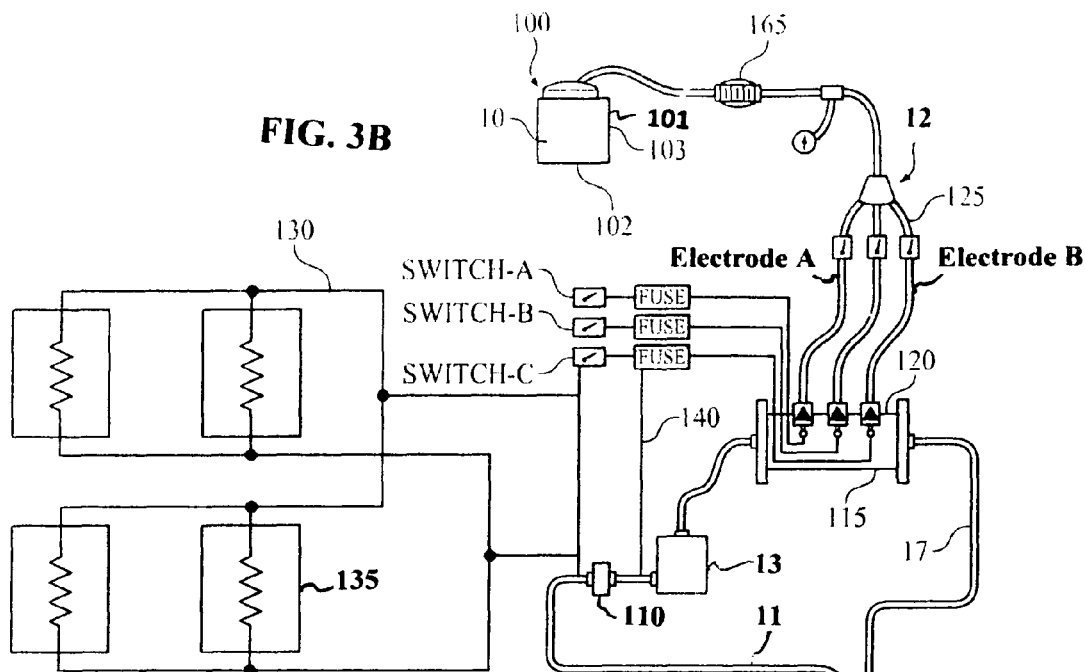
FIG. 3B is seen further exemplary description of certain embodiments of the disclosure further comprising a device for producing hydrogen from seawater.
Figure 3A:
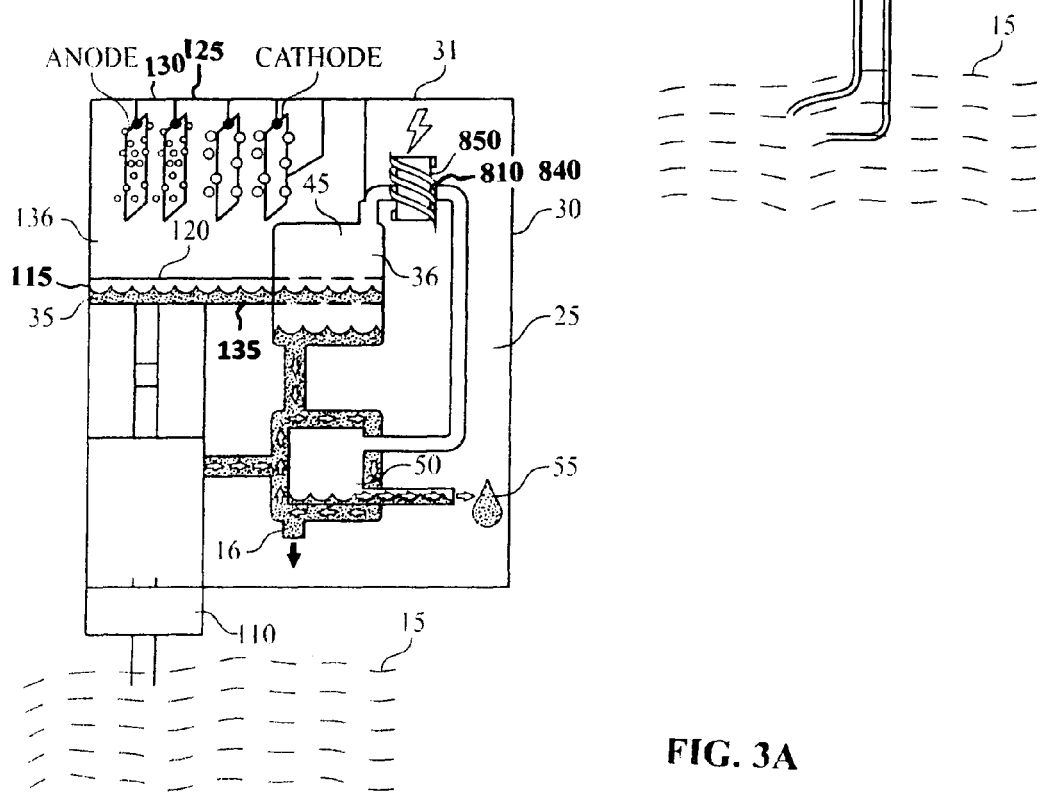
FIG. 3A is seen further exemplary description of some embodiments of the disclosure comprising the vessel plant configured with a device for producing electrical energy, hydrogen, oxygen, methane, salt, and desalinated water.

Referring to FIG. 3A is seen further exemplary embodiments of the vessel configured with further devices for producing hydrogen 100. Hydrogen does not naturally exist in its free state, so it must be separated out from other compounds in nature, such as seawater 15. In the disclosed embodiments, a pump 110 is provided to direct ocean water into a heat exchanger 115. The heat exchanger 115 "Evaporator" is operatively connected to a reaction chamber 120 operatively configured with control valves 125. The control valves 125 are responsive to flow rate of hydrogen 100 and oxygen 101. In some embodiments of the disclosure, the devices for producing hydrogen 100 comprise of electrolysis apparatus. In some embodiments, the apparatus is configured with electrical energy 130 to empower the heat exchanger 115. In this disclosure, the electrical energy 130 is the energy generated from the abundance of ocean energy and is a renewable energy.

In certain embodiments, the configuration for obtaining the required energy 130 comprises a circuitry 135. The circuit 135 is further configured for heating the seawater 15 to separate the hydrogen 100 from the oxygen 101. In certain embodiments of the disclosure, the apparatus is further configured for increasing the temperature of the seawater 15 to increase the rate at which the hydrogen would be produced. In the disclosed embodiments, the salt 16 contained in the seawater 15 is the electrolyte. In other embodiments, the salt 16 enhances the ability to conduct electricity. In some embodiments of the disclosure, a direct current 130 controlled from the renewable energy is applied between two electrodes (A and B) 'Anode and Cathode'. In certain embodiments of the disclosure, the electrodes (A and B) are immersed in the solution 136 to enable hydrogen bubble through the steamed seawater. The hydrogen bubble is enabled from the negative electrode A (Anode). The positive electrode B (Cathode) contains the oxygen 101. Yet in other embodiments, evaporation chamber for the steamed seawater is disclosed. The evaporation chamber creates vapor 36, which turns turbine 810 and/or 840. The vapor 36 is piped to condenser chamber 50 where all the heat from the steamed seawater is rejected through further recycling of cold sea water.

Referring to FIG. 3B is seen some exemplary embodiments of the hydrogen production apparatus configured with the vessel plant 10. In some embodiments, the pump 110 is configured with a suction line 11. In certain embodiments, the hydrogen apparatus is further configured with transmitters 140 responsible for regulating the flow of energy 130 to the electrodes A and B for the reaction chamber 120. Hydrogen and oxygen wires 12 are disposed in the reaction chamber 120 responsive to hydrogen 100 and oxygen 101. The control valve 125 is operatively configured with the hydrogen and oxygen wires 12 for controlling the hydrogen 100 and oxygen 101 flow volumes. The flow volumes are read at the pressure gauge and directed to storage tanks 10 and 30. The vapor from the steam is piped to the condenser chamber 50. Some embodiments herein describe a device 50 wherein steam is rejected. The vapor from the steamed seawater is directed to the condenser chamber 50, where all the heat are rejected through further recycling of cold seawater 15. In some embodiments of the disclosure, the distillates are isolated and processed through at least a membrane 13 filtration.

Figure 4:
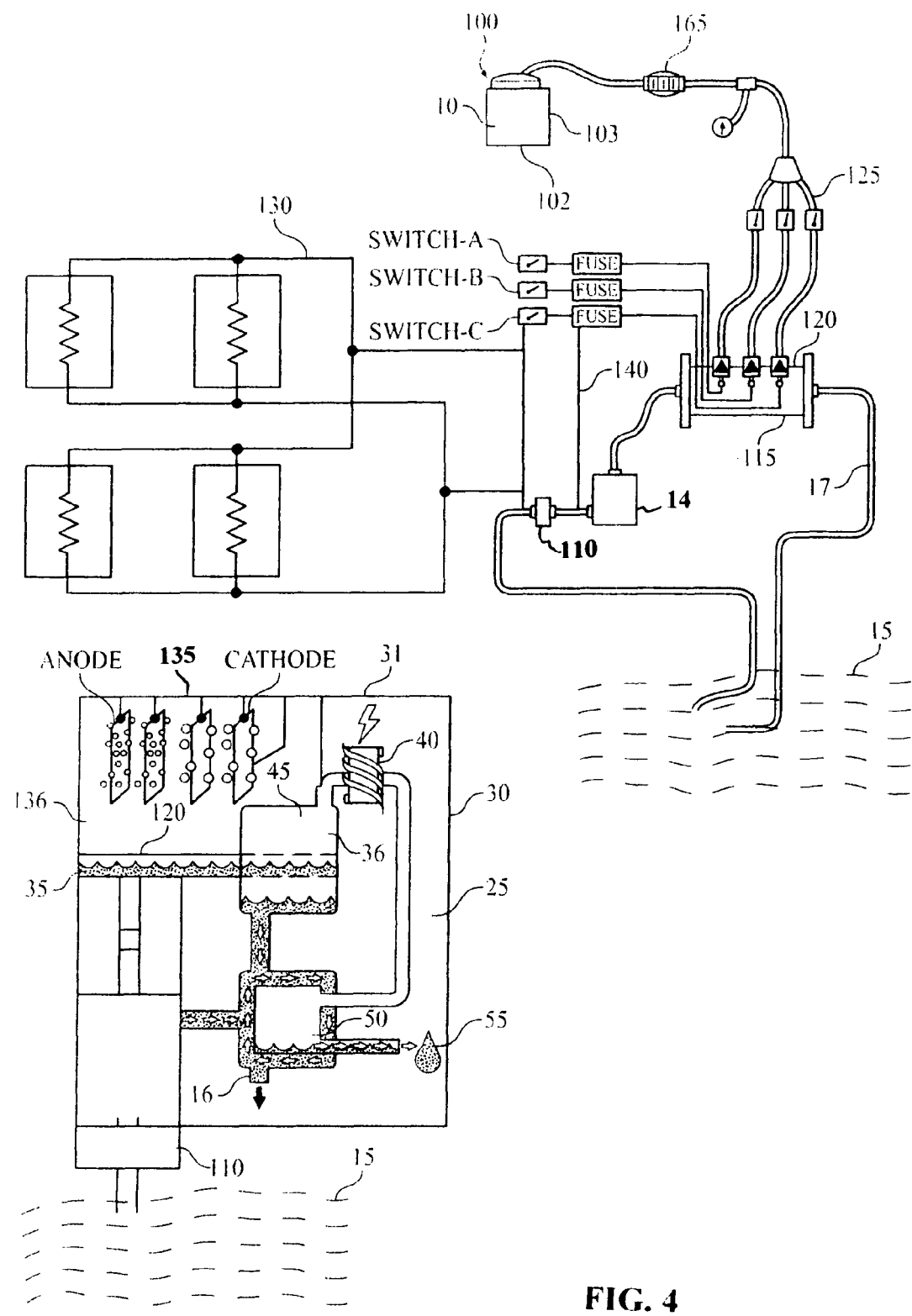
FIG. 4 is seen further exemplary description of other embodiments of the disclosure comprising a device for producing desalinated water. Further embodiments show operational configuration with the hydrogen production device.

Referring to FIG. 4 are seen certain exemplary embodiments of the hydrogen production apparatus. The apparatus include, in some embodiments, a device for generating electrical energy from the variety of ocean energy sources. In some embodiments of the disclosure, the device further includes transmitter circuits communicatively connected to the generated electrical energy source. In certain embodiments of the disclosure, the transmitter circuit is a DC to AC power inverter. In some embodiments, transmitter circuit is a transmitter comprising of energy source operatively configured with the heat exchanger 115. The heat exchanger is configured for raising the temperature of the seawater to improve the rate of producing hydrogen gas 100. Some embodiments herein describe an apparatus for producing hydrogen gas 100 by immersing a magnesium/magnesium alloy anode electrode (Electrode A) and an aluminum/aluminum alloy cathode electrode (Electrode B) in water electrolyte chamber 120. The water in the electrolyte chamber 120 is seawater 15, which have been heated to raise the temperature. In some embodiments, the seawater temperature is raised by direct solar energy reflection on the surface of the seawater The apparatus, in some embodiments, include switches (A, B, and C), which are activation switches. A switch is responsible for turning on the water pump 110, and a switch is responsible for turning on the reaction chamber 120. Some embodiments provide a system configuration for efficient electrolyte chamber reaction. The configuration further comprises a cell comprising a transmitter 140 for providing regulated flow of electrical energy 130 at the electrodes (A & B) for producing hydrogen 100 and oxygen 101. The transmitter 140 is further responsive to the polarity of the electrodes (A and B). The cathode is responsive to electrode reduction reaction and the anode is responsive to electrode oxidation reaction. The apparatus, in some embodiments, comprise of at least a process for producing methanol and other useful solutions.

The apparatus, in further embodiments, comprise the pump 110 configured with a suction line responsive to pulling seawater 15 into the heat exchanger 115 in which the seawater 15 is heated. The system include, in some embodiments, process of heating the seawater 15, separating salt 16 from it, and directing the steam 35 to an evaporation chamber 45. Some embodiments provide the evaporation chamber 45 in configuration with a supplemental turbine 40. In this embodiment, the heat exchanger 115 is operatively configured with the reaction chamber 120 and the evaporation chamber 45. The steam 35 from the chambers 115 and 120 is separated from salt 16, and the steamed vapor 36 is pressure driven to further turn the supplemental turbine 40, further generating electrical energy. Some embodiments herein describe a device for producing desalinated water and salt. The device, in some embodiments, comprises a supplemental turbine 40 operatively configured for generating electrical energy, thereby regaining more than the energy lost to thermal energy for the production of hydrogen 100, desalinated water 55, and salt 16. The system includes, in some embodiments, an apparatus for the wind and hydropower vessel plant 10 which produces 100 percent renewable energy that is cleaner, nonpolluting, reliable, viable, and available.

The supplemental turbine 40, in some embodiments, is vapor driven and would regain the energy lost to the heating process. The vapor 36 leaving the turbine is directed to the condenser chamber 50, where it is condensed and cooled by the cold pumped seawater 15, producing desalinated water 55. The desalinated water is produced from the condensation process. The vapor from the steam is piped to the condenser chamber 50 where all the heat from the steamed seawater is rejected through further recycling of cold seawater 15. Some embodiments provide isolation process where the distillates are then isolated and processed through a membrane 13 for filtration. The desalinated water from the filtration process could then be used and /or processed as drinking water. The temperature and electrical energy is very important in the hydrogen gas generation process. Higher temperature of the water 35 and higher electrical energy 130 for the electrolysis would produce higher hydrogen output 100. Additionally, a small 350 MW of energy producing vessel plant could produce about 420 million liters of drinking water a day. A large wind and hydropower vessel plant could produce more than 1000 MW of electrical energy a day.

The vessel plant 10 is an offshore platform for renewable energy, hydrogen, oxygen, methane, salt, and drinking water plant. If all the disclosed energy sources are utilized for converting ocean energy into electrical energy, the plant 10 would produce more electrical energy than a typical nuclear power plant. Some embodiments of the vessel plant include offshore nuclear energy plant. The construction of the vessel plant would offset its expenses from the energy that would be produced and the sale of hydrogen, desalinated water, salt and methane. The entire energy process is carbon free. The vessel would be connected to transmission lines 25, grids 30 through connections to other storage devices such as ultra-capacitors 900. The connections to transmission lines 25 and grids 30 are by cables 31. Further embodiments of the disclosure include the production of sea salt 16 offshore for transportation to other markets. The device, in some embodiments, produces hydrogen 100, which could be used to empower cars, airplanes, ships, and trucks. The only non polluting hydrogen generator to date is water, and the disclosure of the preferred embodiments teaches the best method to generate electrical energy, desalinated water, hydrogen, oxygen, methane, and salt without leaving any pollutant. The vapor 36 from the steam is piped to the condenser chamber 50, where all the heat from the steamed sea water is rejected through further recycling of the cold seawater.

In some embodiments, the distillate is isolated and processed through a membrane 13 for filtration. The membrane 13 is further configured with nano technology applications embedded in silicone substrate 14. In certain embodiments, the silicon substrate 14 further comprises nano sensors operatively configured for detections. Some embodiments herein describe a detection device, further include detecting any bacteria or contaminant and further comprise of bacteriological analysis to enable safe drinking water from more secured water production process.

Figure 5:
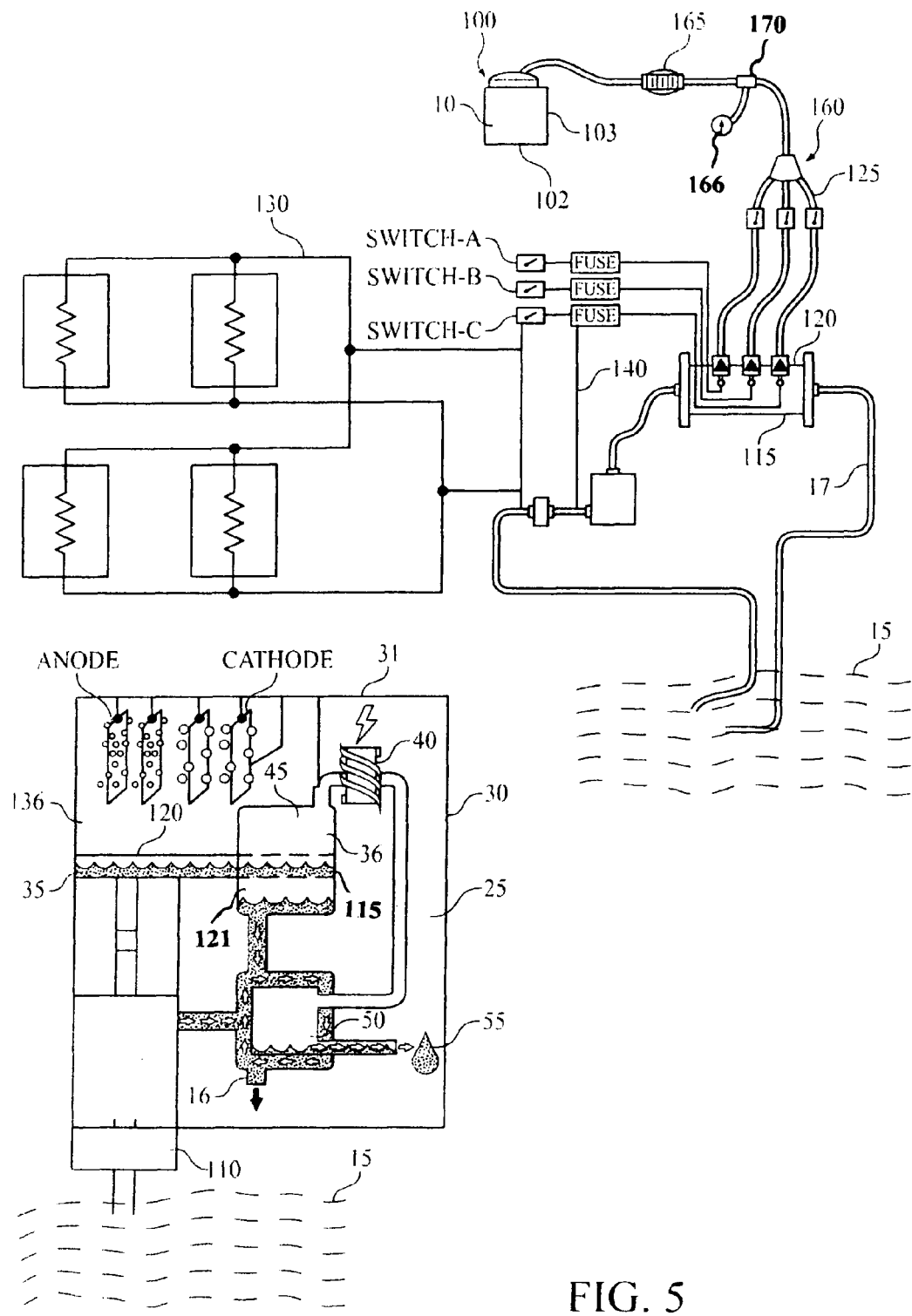
FIG. 5 is seen further extension of the exemplary description of some embodiments of the desalinating device in configuration with the hydrogen production device configured to enable further production of salt and methane.

In other embodiments of the disclosure, the electrical energy lost to thermal energy is regained when the vapor 36 turns the turbine 40, 810 and/or 840 to further produce supplemental electrical energy. The amount of electrical energy to be produced through the evaporation process depends on the volume of the evaporator and the amount of thermal energy generated. Cold sea water is used as heat sink in the condensation process to cool the vapor to produce desalinated water 55. Salt 16 is also produced in the disclosure of certain embodiments. Referring to FIG. 5 is seen further exemplary embodiments of the disclosure for hydrogen gas production. The hydrogen gas 100 from the reaction chamber 120 is collected through pipes 160 and stored in hydrogen tank 102. The apparatus include, in some embodiments, a one way pressure valve 165 configured to prevent back pressure and to enable rapid repair down stream without losing any amount of hydrogen and/or oxygen from the tanks 102 and 103. In certain embodiments of the disclosure, the configuration of the hydrogen production system is responsive to DC over AC to enable better hydrogen/oxygen separation. Some embodiments provide the electrical energy to produce the hydrogen 100 from an apparatus responsive to the abundance of ocean energy sources. In certain embodiments, the electrical energy is to enable efficient hydrogen production in larger scale.

Seawater 15 already contains the necessary electrolyte substances to enable the production of hydrogen 100 at much larger scale. This could be achieved through the disclosure of certain aspects of the embodiments. The wind and hydropower vessel plant 10 further comprises an apparatus responsive to the abundance of sea energies. The apparatus include, in some embodiments, the hydrogen system configured with switch-A, configured for turning on the reactor chamber 120. A return line 17 is operatively configured with the reaction chamber 120.

Switch-B is configured for activating the water pump 110. Switch-C is operatively configured for closing and opening the electrical shutoff valves 125 for the hydrogen tank 102 and or oxygen tank 103. The vessel plant 10 is further configured to supply fuel cell power plants with consumable hydrogen 100 for peak load periods. The hydrogen is also stored in tanks 102 for later use.

The hydrogen 100 may be used as transportation fuel or as a natural gas supplement when needed. Refining renewable energy through the wind and hydropower vessel plant 10 would provide future advantages over land-based units. The hydrogen 100 is separated from its molecular bond with oxygen by exposing the seawater 15 to the reaction chamber 120. The reaction chamber 120 is operatively configured with a water pump 110 responsible for pumping water from the ocean 15 into the chamber 120. The reaction chamber 120 is further configured with a heat exchanger 115 comprising heating the seawater to a predetermined temperature to enable efficient and effective hydrogen production. The electrical energy for empowering the heat exchanger 115 to enable thermal energy is from the renewable electrical energy generated by converting the ocean energy sources. The energy to empower the heat exchanger is renewable, reliable, available, viable and non pollutant. The apparatus, in some embodiments, converts the thermal energy back into renewable electrical energy.

The energy to the electrodes is DC and comprises a positive charge (Cathode) and a negative charge (Anode). A transmitter 140 is operatively configured with the reaction chamber 120 and comprises these charges. Hydrogen 100 is attracted to the negative charge (Anode) and oxygen is attracted to the positive charge (Cathode). The positive charge draws oxygen molecules, which may be vented through the return line 17 and/or stored in tank 103. In some embodiments, the hydrogen 100 attracts electrode and extent through welded pipes 160 to the hydrogen tank 102. A pressure gauge 166 is connected to the hydrogen tank 102. A pressure regulator 170 is configured with the pressure gauge 166 and communicatively connected to the tanks 102 and 103.

Some embodiments herein describe hydrogen processing system further configured with a secondary tank 121 operatively configured with the heat exchanger 115. The secondary tank 121 further comprising a pump 110 operatively configured with the system for generating and/or capturing energy. An evaporation chamber 45 is configured with the tank 121. Steam 35 from the thermal process is created through the heat exchanger 115 into the evaporation chamber 45. Vapor 36 from the steam 35 is elevated at the evaporation chamber 45, and directed to turn a turbine 40. In other embodiments, the turbine 40 is configured for generating electrical energy. The vapor 36 is piped to a condenser chamber 50 and condenses as cold seawater 15 is circulated. Pure water 55 "Desalinated water" is produced as a result. In the thermal process, salt 16 is separated from the seawater 15 and could be processed for commercial use. The produced hydrogen/oxygen 100 and 101 are stored in tanks 102 and 103.

Figure 6:
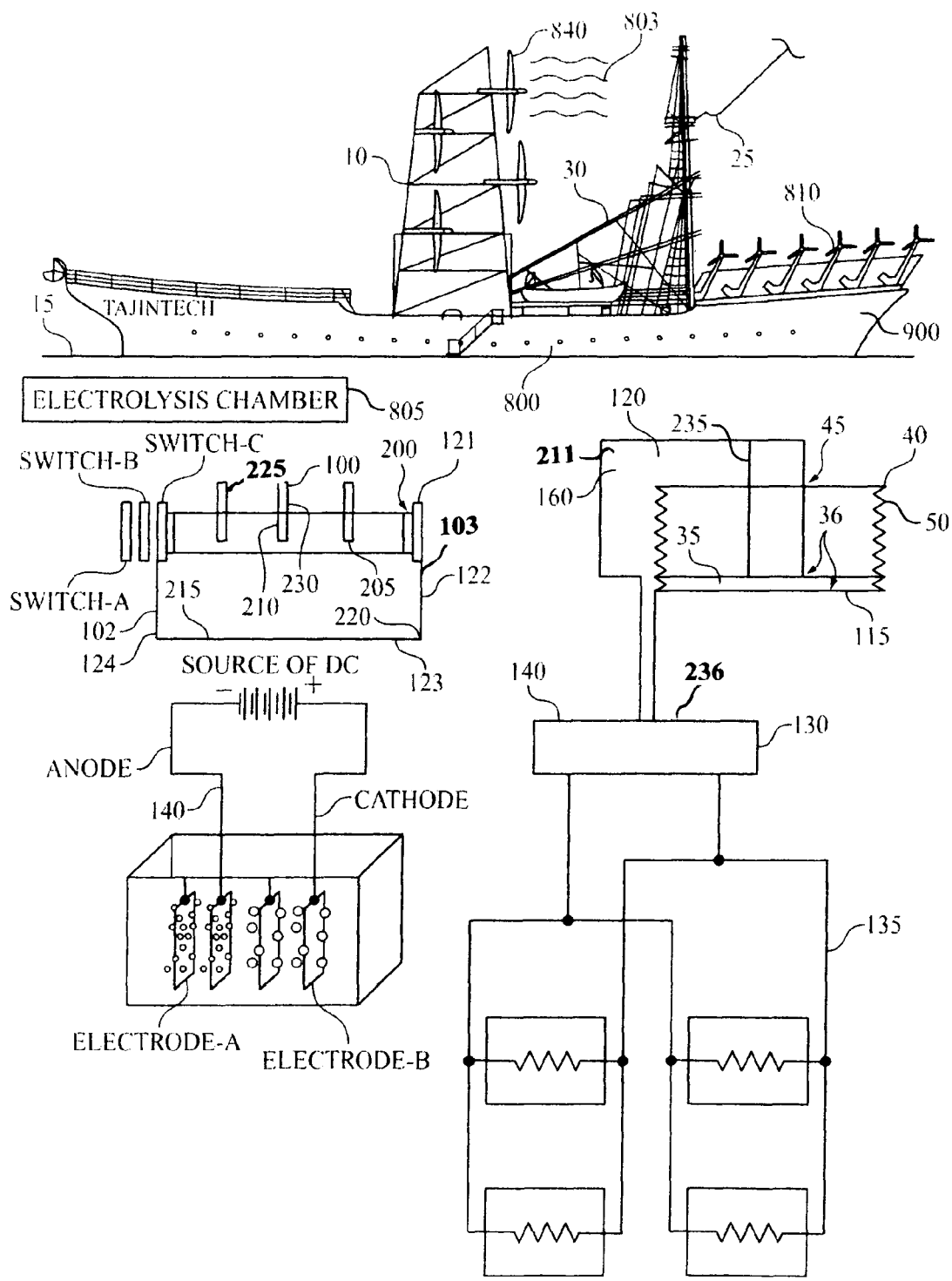
FIG. 6 is seen an exemplary description of the some embodiments of the disclosure further comprising a device for producing desalinated water and hydrogen. The embodiments herein describe the device in configuration with a vessel plant.

Referring to FIG. 6 is seen further exemplary embodiments of the vessel plant 10 comprising wind turbines 810 and 840. The vessel plant is positioned in the ocean 15 where ocean wind 803 exists. The force of the ocean wind 803 propels the turbine 810, 840, which then produces electrical energy. The electrical energy could be stored in a storage medium 900, or it could be transported to grids 30 or transmission lines 25. Further embodiments, the configuration of the vessel plant includes apparatus for producing hydrogen 100. The apparatus for producing hydrogen 100 further comprising seams 200 configured with dual shield 205 welded from both sides to enable efficient penetration with minimal porosity. Hydrogen resistance tubes 210 are operatively configured with the device, comprising plastics 211 disposed at the center of the larger steel pipes 160. The steel pipes 160 are operatively configured with plates 215 securely attached to the outer and inside tanks. These plates 215 have openings 220 that allow the hydrogen gas 100 to pass through the full length of the tank 102. The surfaces 121, 122, 123, 124 of the tank 102 are electro plated to protect against corrosion and also to protect the hydrogen. The electroplating may comprise at least one of: a copper base material, a nickel material, and a cadmium material.

The tank 102 further comprises couplings 225 communicatively connected to the hydrogen reaction chamber 120 for adding liquid to the tanks and for purging air prior to producing hydrogen 100 and oxygen 101. The tanks 102 and 103 comprise an inlet 230 through which hydrogen and oxygen are filled, and an outlet 235 through which the hydrogen and oxygen are drained. The tanks are communicatively connected to pressure monitors comprising a control system 236 which shuts the electrolysis system down when the tanks pressures reach predetermined threshold value. The control system 236 is further responsive to high speed switching circuit 140. The circuit 140 comprises at a transmitter operatively configured to modify the high amperage low voltage DC responsive to the electrolysis for maximum efficiency.

Figure 7:
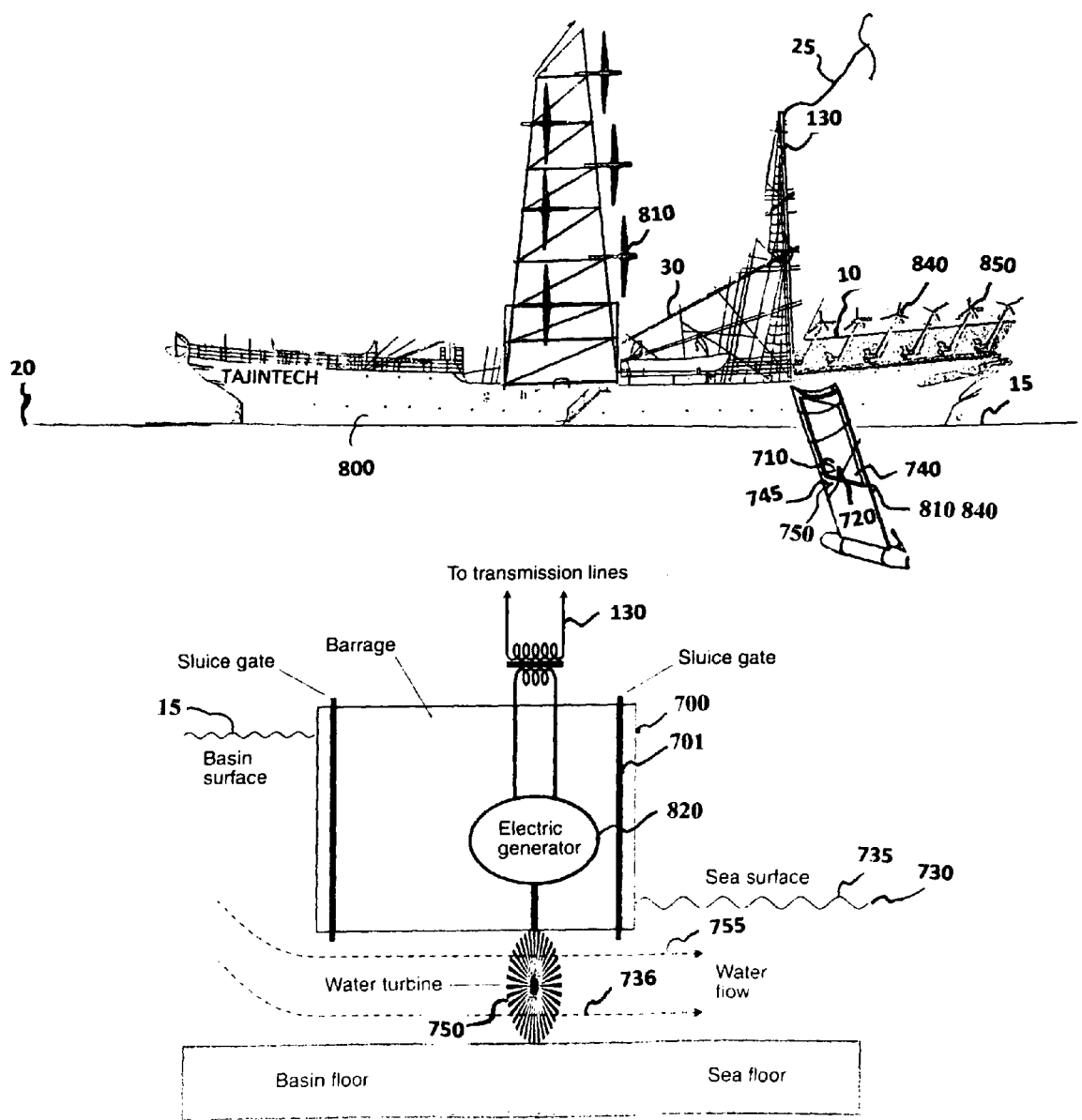
FIG. 7 is seen an exemplary extension of the vessel plant as disclosed in the preferred embodiments comprising apparatus for harnessing the abundance of ocean energies. The vessel is configured with regenerative hydropower, wind mills, tidal energy conversion device, transmission lines, and grids.

Referring to FIG. 7, is seen certain embodiments of the disclosure, including a vessel 800 comprising of a vessel plant 10 configured for converting ocean energy sources into electrical energy. In some embodiments, the energy generated by the vessel plant 10 could be offloaded and transported offshore 20. The energy could also be transported to electrical power grids 30 or to transmission lines 25. Current advantages include higher average wind speeds, wave energy not available to land based windmills, regenerative hydropower not available in conventional hydropower plants, and other ocean energy such as tidal power not also available on land-based energy plants.

In certain embodiments, the configuration of the vessel plant further includes apparatus for converting tidal energy into electrical energy. The tidal energy conversion through a vessel plant 10 is reliable, predictable, and non-polluting. The wind and hydropower vessel plant 10 is further configured with devices to harness ocean flow that reverses directions. The turbine 810, 840 further comprises a nacelle 850 responsive to the flow direction of the ocean wind to maximize efficiency and effectiveness. The wind and hydropower vessel plant 10 further comprises devices for converting ocean's variable energy sources into renewable electrical energy. These devices are configured to capture, convert, and store free ocean energies. The vessel plant 10 is disposed with wind turbine 810, 840 comprising wind operated devices for harvesting the natural available wind energy within the ocean and converting the abundant of energy into electrical energy 130. The vessel plant 10, in certain embodiments, further include the apparatus configured with a tank 700 comprising a sluice gate 701, a turbine 810 configured with a generator 820 for converting tidal energy into electrical energy 130.

A wing 740 configured with the vessel 800, comprising a horizontal or vertical hull 710. The hull 710 comprising a turbine 810 and 840 operatively configured with a generator 720 for converting ocean wave 730 into electrical energy 130. Some embodiments of the apparatus further include a wing 740 configured with a device for capturing hydrogen from underwater.

The wing 740 is further rigged for capturing wave energy, and comprises tapered hull 745 configured with wheels/gears 750 responsive to kinetic energy.

The kinetic energy propels the wheels 750. The wheels 750 are responsive to converting the kinetic energy into mechanical energy. The mechanical energy is converted into electrical energy by the generator 720. The wings 740 could be driven by the entire weight of the vessel plant 10 as it rides through the waves 730. This disclosure further teaches regenerative hydropower. The wings 740 may be positioned very deep in seawater 15, responsive to static or laminar layer of the water. In further embodiments, the static and/or laminar layer of the seawater 15 is responsive to the differential between the wave surface 735 and the stable lower water 736. In certain embodiments, the floatation of the wheels 750 above and below the waves 730 enables the static layer to capture the potential energy differential. The wave energy is the friction between the air and the water surface. This friction causes ripples that grow into wavelets before turning into waves 730.

In other embodiments, the vessel plant 10 is further configured with a tank 700 comprising a sluice gate 701, a turbine 810 configured with a generator 820 for converting tidal energy into electrical energy 130. Yet, in some embodiments, the waves 730 are turned into swells 755, which contain the capacity to generate usable power. The power is dissipated when the swells reach the shore in the form of breakers 756. The turbine 810 and 840 are responsive to the swells 755 and are configured with generator 820 for converting the power of the ocean swells into electrical energy. In other embodiments of the disclosure, the apparatus comprises at least a hole which is operatively connected to the turbine.

Figure 8:
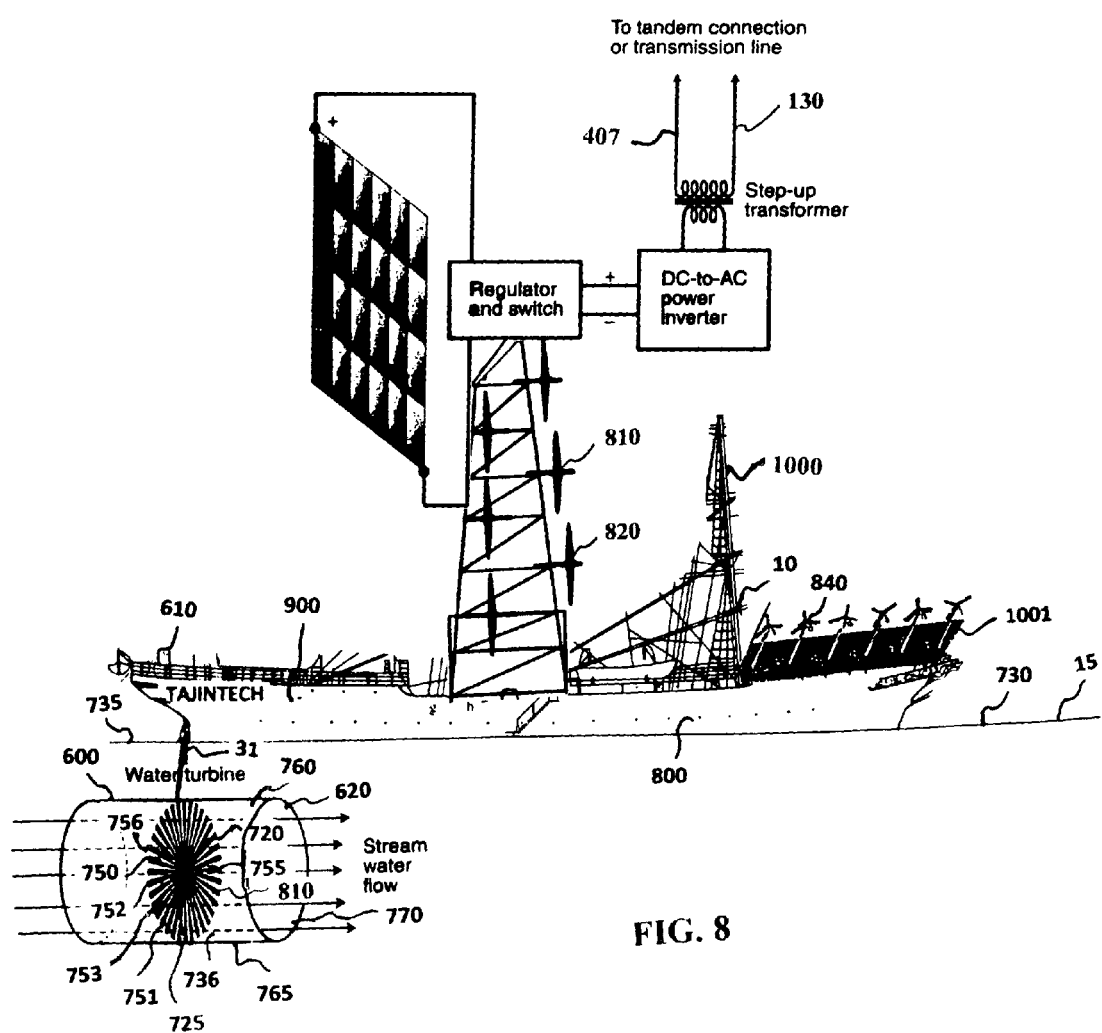
FIG. 8 is shown further aspects of the disclosed embodiments comprising an exemplary description of further device configuration for producing renewable electrical energy.

Referring to FIG. 8 is seen further exemplary embodiments of the wave energy conversion device configured with the vessel 800. The vessel 800 comprises a vessel plant 10 comprising wind energy turbine 810 and 840 responsive to the movement of the ocean wind. The vessel plant 10 is positioned on the ocean 15 consisting of surface waves 730. The vessel plant 10 is operatively configured to dispose a buoy 760 in the ocean 15. The buoy 760 is operatively configured with an actuator 765 responsive to up and down motion of the wave 730. The buoy 760 is further configured for generating electrical energy. The upstream and downstream motion 735 and 736 of the wave 730 drives the electric generator 720 that is responsible for generating renewable electrical energy 130. The wave energy 730 is captured and converted into electrical energy by turbine generator 720. The configuration of the turbine for capturing the wave energy may include fiberglass fins 770 comprising water wheels 750 driven by kinetic energy.

The water wheels are configured for converting kinetic energy into mechanical energy. The wheels 750 are further angled responsive to maximum torque. The wheels 750 are operatively connected to rotatable shaft 755, which may comprise of a fiberglass. The collars 756 are responsive to the kinetic energy created due to the wave current 730. In some embodiments of this disclosure, the kinetic energy is converted into mechanical energy. In other embodiments of the disclosure, the mechanical energy is converted into rotational motion through the shaft 755 to the generator 720. The generator 720 then converts the mechanical energy to electrical energy. The generator 720 is environmentally sealed for protection against ocean water.

In other embodiment, the buoy 760 comprises a system for generating energy. The system is configured with a water tank 600 and a controller 610, which is communicatively connected to the vessel plant 10. The vessel plant 10 further comprises a storage medium 900 for storing electrical energy. The buoy 760 further comprises the turbine 810 and 840, which are submersible into the ocean 15. The turbine is operatively configured for generating electrical energy in response to transmission signal from the buoy. In certain embodiments of this disclosure, the buoy 760 is configured and operable where ocean current speed is desirable. In some embodiments of the disclosure, the buoy is operatively configured with the water turbine 810 and 840. The turbine 810, 840 is communicatively connected to a mooring 721, which is communicatively connected to the vessel 800. In other embodiments, the vessel 800 comprises the vessel plant 10 operatively configured with crane 1000. Still in certain embodiments of the disclosure, the vessel plant 10 further comprises a platform configured on a skid 1001. The buoy 760, in certain embodiments, is operatively connected to the mooring 721 and disposed into the ocean 15 through the crane 1000 configured with the vessel 800. A communication means 31 communicatively connects the buoy 760 to the vessel plant 10. The vessel 800 is responsible for disposing and retrieving the buoy 760 to and from the ocean 15. The design structure is such that the velocity of the ocean flow initiates rotation on the blade 751. The rotational torque is then transmitted to the generator 720. The generator 720 then converts the torque into an alternating electric power for transmission to the storage medium 900, grids 30, and/or transmission lines 25.

The controller 610 is operatively configured with the vessel plant 10 and responsive to the generated energy from the buoy 760. The generated energy is transportable and transferrable to external storage mediums through the communication means 31. The communication means may be comprised of cables for transmissions and/or for offloading. The turbine 810, in some embodiments of the disclosure, is further configured with bodies that are operatively connected to a generator. These bodies further include the shaft 755, the gear 750, and/or the blade 751. The generator 720 comprises a winding 725, which is completely sealed to prevent the entry of water. The buoy 760 is further configured with the controller 610 and responsive to turbine operation. The turbine 810, in other embodiments of the disclosure, further comprises a bearing 752 operatively configured with a magnet 753. The magnet 753 is communicatively connected to the winding 725, which is operatively configured with the blade 751. The flow pressure of the ocean 15 rotates the blade 751 to enable rotation through the shaft 755 to the magnet 753. The rotation at the magnet is perpendicular to the ocean flow and is responsible for the electrical energy being generated.

Figure 9:
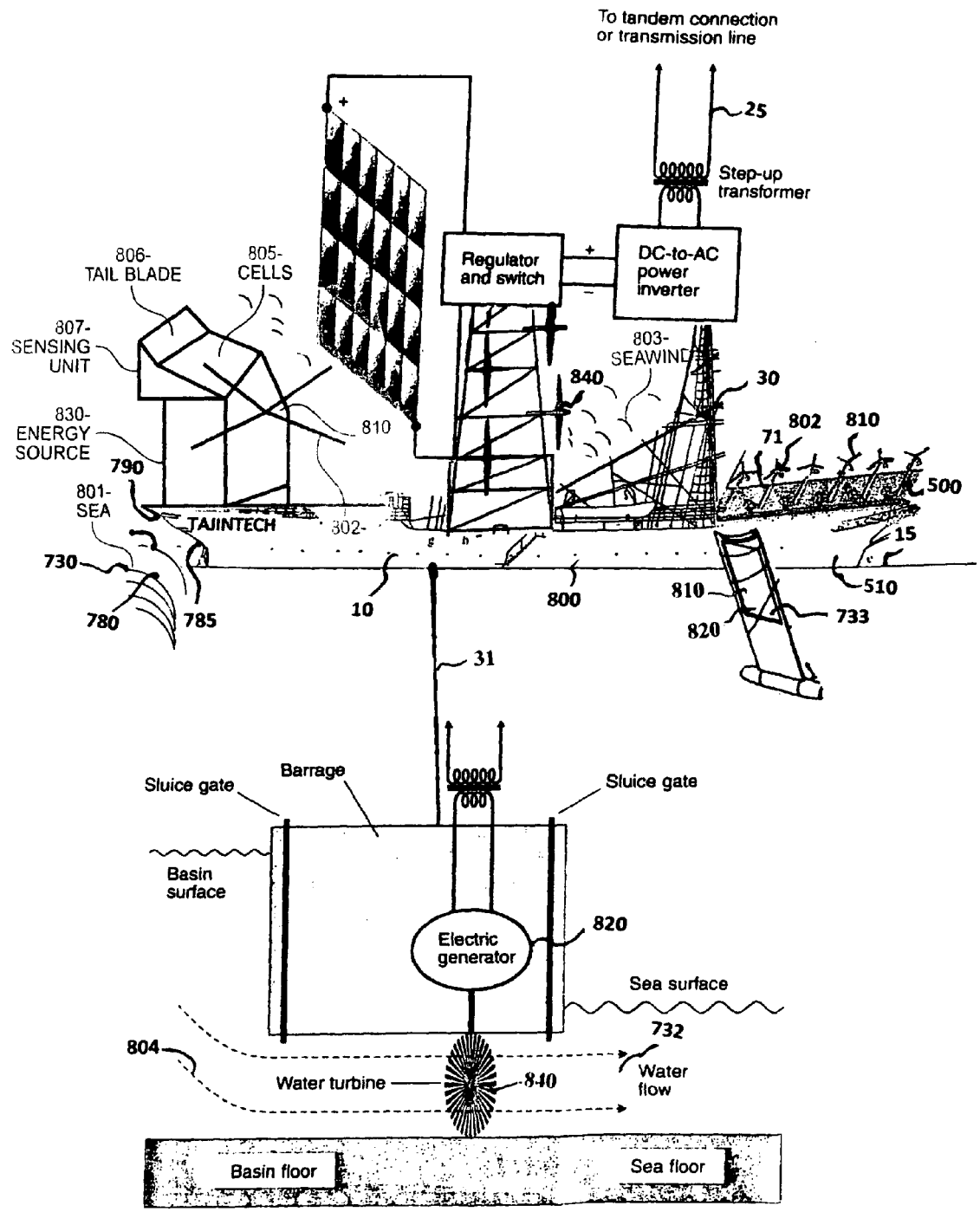
FIG. 9 is shown further description of other embodiments of the disclosed apparatus configured with further devices for producing renewable electrical energy.

Referring to FIG. 9 is further seen an exemplary embodiments of the wind and hydropower vessel plant 10. The disclosed embodiment is related to a wind and hydropower vessel plant 10 for converting ocean energy into renewable electrical energy. The vessel 800 comprises wind and hydropower turbines 810 and 840 each configured for converting at least one of ocean wind, ocean current, ocean wave, and ocean tides into renewable electrical energy. The vessel 800 comprises wind tower 71 comprising turbine 810, 840 and generator 820. The 800 vessel is positioned at the ocean 801 comprising ocean current 804, ocean wave 730, tidal current 732, and wind 803. In some embodiments, a regenerative hydropower device 733 is configured with the vessel 800. Other embodiments include an apparatus for harnessing the abundance of energy from the ocean 801. The ocean 801 consist of natural energy such as ocean wind 803, ocean wave, ocean tidal energy, and ocean current 804. The vessel 800 is operatively configured with devices for converting the ocean wind 803, ocean current 804, tidal current 732, wave energy 730, and the energy from the regenerative hydropower 733 into renewable electrical energy. The turbine 810 and 840 is configured for converting kinetic energy into mechanical energy. The mechanical energy is then converted into electrical energy by the generator 820, producing renewable energy which is stored at the energy source 830. In certain embodiments of this disclosure, multiple sources of energy conversion are incorporated. In the later embodiment, the ocean wind 803, the ocean wave 730, the ocean tidal energy 732, the regenerative hydropower, and the ocean current 804 are converted into renewable electrical energy which is stored into the energy source 830 for transmissions.

The turbine is operatively configured with the electrical generator 820. The generator 820 is responsive to kinetic energy from the ocean flow, converting the kinetic energy into electrical energy. The apparatus further include, in some embodiments, converting the constant availability of the ocean energy sources into renewable electrical energy. The electrical energy generated from the flowing ocean is attractive and consistent, enabling efficient renewable energy source. The wind and hydropower vessel plant 10 is an advanced supplemental energy plant that could be readily deployed with all installations assembled to meet the maximum product demand similar to operating a conventional land-based electrical power plant and/or nuclear power plant. The renewable energy by the vessel plant is transportable and could be produced on demand. The hydropower 733 comprises a floatable wing 733 which is immersed in the sea. The apparatus, in some embodiments, comprises the wing 733 opearatively configured with a generator armature. In certain embodiments, the generator armature comprises at least a linear generator operable in a linear reciprocating motion relative to the stator for generating electrical power. The hydropower 733 is configured with the vessel 800 further comprising apparatus for detecting the onset or occurrence of sea conditions non favorable to the operation of the generators. The detection apparatus, in certain embodiments, is operatively configured with a communication means 31 responsive to the floatation of the hydropower 733. The communication means 31 is operatively configured with the controller responsible for submerging the hydropower 733 sufficiently in the ocean to avoid any significant damage to the generator. The hydropower 733 further comprises hydroelectric power configured with turbine generator apparatus that could be lowered into and/or raised from their operating positions.

In some embodiments of this disclosure, the vessel 800 is further configured with at least a turbine and operatively connected to blades/gears in communication with the generator. In certain embodiments, the turbine comprises of at least a tail vane 806. In other embodiments, the tail vane 806 comprises of at least a sensing unit 807. Yet in certain embodiments, the turbine 810, 840 comprise of at least a propeller blade 802. Still in some embodiments, the tail vane 806 is configured with at least a cell 805. Yet in another embodiments, the turbine 810, 840 comprise of at least a wind tower 71 operatively configured with the tail vane 806 and the propeller blade 802. The propeller blade 802 is operatively configured to be powered by the ocean wind 803. The tail vane 806 is operatively configured to enable the propeller blade 802 to rotate due to the force of the ocean wind 803. The propeller blade 802 is operatively configured with rotors responsible for enabling rotation with the wind.

Kinetic energy is created along the blades movement. The kinetic energy is converted into mechanical energy by the turbine blade rotation 802. The mechanical energy is transferred through the turbine shaft to the generator 820 for conversion into electrical energy. The vessel plant 10 is further configured with devices for converting the flow of ocean current 804 into renewable electrical energy. In this disclosure, the energy is to be stored in storage medium such as energy source 830 and cells 805. The stored energy at the cells 805 is transferrable to transmission lines 25 and/or grids 30.

The configuration of the vessel 800, in some embodiments, further relates to underwater structure designed to increase the velocity of the tidal currents 732 through the walls 790. The electrical output of the underwater turbines is maximized by the acceleration structure of the walls 790. The configuration of the walls 790 further relates to improving the efficiency of the regenerative hydropower 733. The wind and hydropower vessel plant 10 would produce more renewable energy to supplement the current capacity of conventional hydropower systems. Conventional hydropower systems are limited to the power that could be generated from the turbines. In addition, maintenance cost for conventional hydropower systems are expensive and requires personnel to plug-in their bodies into high risk areas.

The vessel 800 includes, in some embodiments, multiple turbines for different applications, such as wave energy, tidal current, hydropower, wind energy, and ocean current. The advantage of the wind and hydropower vessel plant 10 for generating renewable energy is that, the vessel 800 could operate in any area where the ocean current speed 804 is lower and/or much higher.

The vessel plant 10, in some embodiments, includes for generating renewable energy to further increase market applications. The availability exists through this disclosure to maximize the limitation of ocean energy sources for renewable energy applications. In some embodiments of the disclosure, the wind and hydropower vessel plant 10 is utilized as one instance for generating electrical energy from the abundance of ocean energies. In certain embodiments, the structure for accelerating the ocean energy is disclosed. The accelerating structure comprises at least a wall 790, whereby the speed of the ocean is increased upon contact with the vessel 800. In other embodiments, the increasing use of the regenerative hydropower 733 is maximized by the accelerating structure 790.

The configuration of the vessel structure includes further embodiments of this disclosure. In some embodiments, the force of the ocean current increases at the accelerating structure 790. In certain embodiments, the ocean current pressure increases through the walls 790. Hydropower is created as a result, whereby the kinetic energy is converted into mechanical energy. The mechanical energy is then converted into electrical energy by the generator 820. The vessel structure is designed to resist maximum loads due to the high currents, as well as the wave loads which resemble a storm. The material used for the vessel is suitable to withstand shock loads and is excellent for high current environment.

The regenerated hydropower 733, in some embodiments of the disclosure, includes apparatus for generating electrical energy from the high accelerated flow of the ocean current against the walls 790. The regenerative hydropower 733 may also be utilized by motioning the vessel 800 and enabling the drag force to propel the blade/wheel configuration with the turbine. The regenerative drag force creates rotational torque on the blade/wheel, which is converted into mechanical energy. The mechanical energy is then converted into renewable electrical energy.

The body of the vessel 800, in some embodiments, further comprises tidal current accelerating structure 785. The tidal current accelerating structure is disposed with the vessel to direct ocean current 730 and increase the speed of the flow. Higher pressure areas resulting from the obstructions to current flow caused by the structure forces the accelerating current to flow with higher velocity. Kinetic energy is concentrated on the high velocity area 780 and the tidal current is maximized and converted into electrical energy. The vessel body structure, in some embodiments, includes elements for accelerating tidal current. In certain embodiments, the vertical walls 500 of the vessel 800 are configured to increase the velocity of the incoming tidal current so that the tidal energy is also increased. The walls 500 are reinforced by structural members 510, which are designed to absorb the shock loads applied to the corresponding sections of the vessel 10. In some embodiments of this disclosure, the vessel body structure is utilized. The body structure is designed to further recharge the velocity of the tidal current and the wave energy of the ocean, creating a hydropower around the accelerated area. Kinetic energy is created as a result, and the kinetic energy is converted into mechanical energy through the turbine blade/wheel. The mechanical energy is then converted into renewable electrical energy by the generator.

Figure 10:
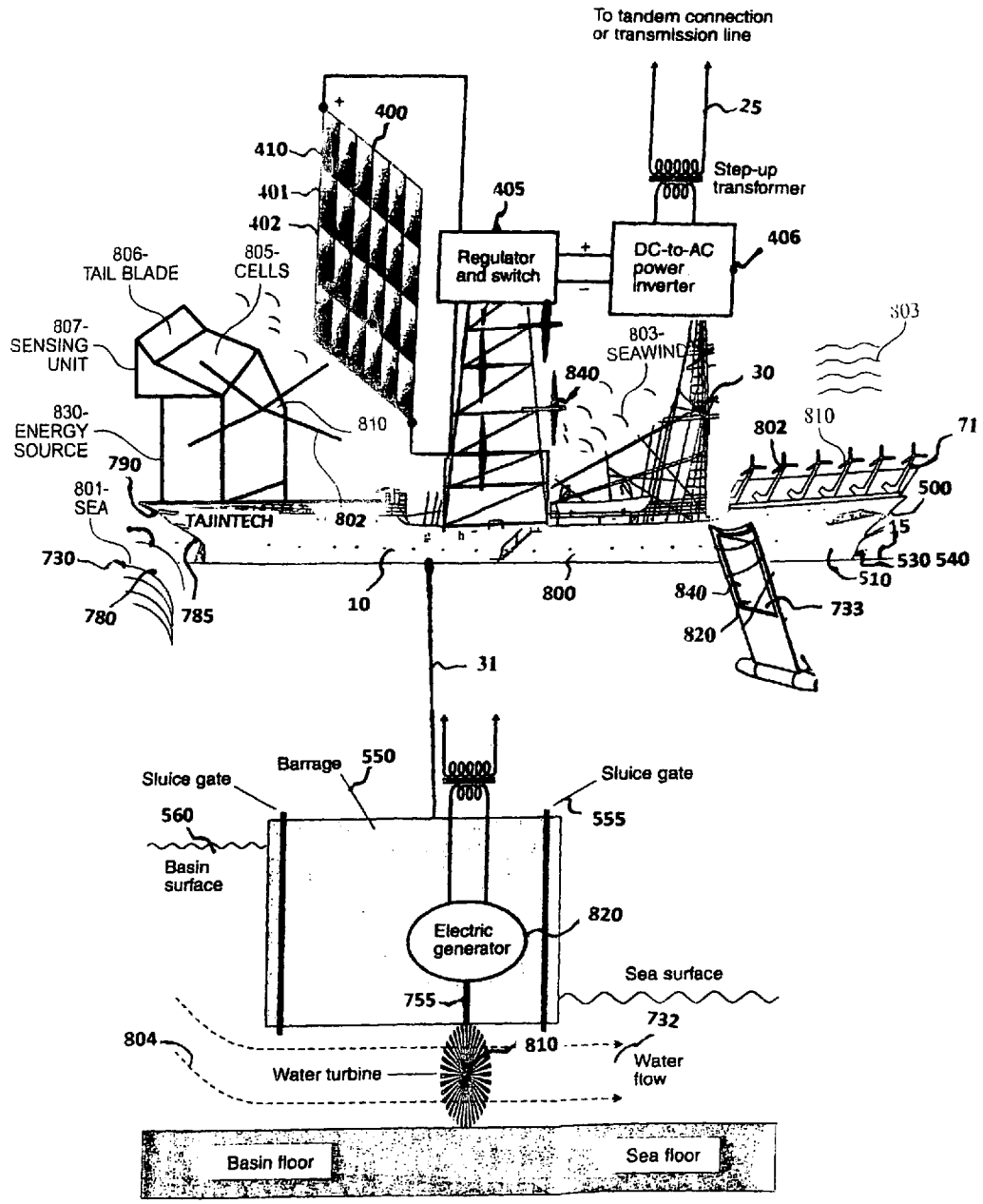
FIG. 10 is seen further description of certain embodiments of the apparatus comprising an extended view of the wind and hydropower vessel plant configured with further devices for producing renewable electrical energy.

Referring to FIG. 10 is seen an exemplary embodiments of a vessel 800 operatively configured with the vessel plant 10. The vessel plant 10 comprises wind turbine 810 and 840 configured on towers 71. The wind turbines 810, 840 are configured with propeller blades 802, which are driven by the ocean wind 803. The tower 71 further comprises cells 805 operatively configured with tail blades 806 and communicatively connected to a sensing unit 807. The cells 805 comprises energy storage medium and the sensing unit 807 comprises a communication means. The cells 805 are operatively configured with energy source 830 comprising the energy generated from the abundance of ocean energy. In some embodiments, the energy to the energy source 830 further includes converted energy from tidal current 732, which are caused by the gravitational fields of the moon and the sun, in conjunction with the rotation of the earth on its axis. In certain embodiments, the vessel 800 comprises structures 500 consisting of structural members 510 responsive to ocean flow acceleration. The vessel plant 10 further comprises high velocity area 780 caused by the walls 790 of the structural members 510. The high velocity area is responsive to the structure 500 for accelerating the tidal current 785. The vessel plant 10 is disposed on seawater 801, which comprises the ocean 15. The wind and hydropower vessel plant 10 further comprises a controllable regenerative hydropower 733, operatively configured with apparatus for producing renewable electrical energy.

Other embodiments of this disclosure include apparatus for converting solar energy into electrical energy. In certain embodiments, a solar panel 400 is operatively configured with the apparatus for converting the sunlight into electrical energy. In some embodiments, the apparatus for converting the sunlight into electrical energy is comprised of at least silicon wafers 401 configured with at least a regulator switch 405 and operatively connected to a DC to AC converter 406 deployed with the vessel 10. The DC to AC converter 406 comprises an inverter configured for converting the voltage into alternating current. The converter 406 is communicatively connected to a transformer 407, which is a tandem connection to transmission lines 25.

In some embodiments, transmission line 25 and a grid source 30 are operatively connected to the converter 406. Yet in certain embodiments, the reflective rays from the sun's heat against the surface of the ocean are attracted by PV cells 402. In other embodiments, the PV cells 402 are communicatively connected to a module 410 configured with the solar panel 400 for producing electrical energy. Still in some embodiments, the ocean tides 732, which are caused by the gravitational fields of the moon and the sun, in conjunction with the rotation of the earth on its axis, are captured and converted into electrical energy through the wind and hydropower vessel plant 10. The tidal energy 804 is the energy that is contained in the moving ocean mass caused by tides. The tides create kinetic energy, and the turbine 810 is configured responsive to the kinetic energy caused by the tidal energy 804 for generating electrical energy. In the later teaching, mechanical energy is first created and the energy is transferred to the generator through the turbine shaft 755. Multiple turbines could be disposed at high and low accelerating current 530, 540 caused by the vessel structure 500, or positioned where the velocity is maximized.

Yet in other embodiments, a tidal barrage 550 is configured with the vessel 800, comprising a sluice gate 555. The sluice gate 555 is operatively configured to open and close, allowing water 15 to flow between bodies of water with different elevations. The flow pattern operates the turbine 810, which is operatively configured with a shaft 755. The shaft 755 is mechanically coupled to a generator 820. In some embodiments, when the tide 732 comes in, the basin 560 fills through a large channel for the tides 732 to reach its highest point. The sluice gate 555 closes during the fill up process. In certain embodiments, when the tide falls, the sluice gate 555 opens for water to flow through the turbine 810, creating a mechanical energy. The mechanical energy is transmitted to the generator 820 through the shaft 755. The generator 820 then converts the mechanical energy into electrical energy.

This tidal energy is the energy that is contained in the moving ocean mass caused by tides. The tides create kinetic energy and the turbine is responsive to the kinetic energy for generating electrical energy. The mechanical energy is first created and transferred to the generator through the turbine shaft 755. Multiple turbines could be disposed at high and low accelerating current 530, 540, or positioned where the velocity is maximized.

The apparatus as described, in some embodiments, comprises a platform. In some embodiments, the apparatus as described comprises platform array. In certain embodiments, the apparatus as described comprises a fixed platform array. In other embodiments, the apparatus as described comprises a mobile platform array. Still in some embodiments, the apparatus as described comprises a submersible platform array.

Yet in other embodiment, the apparatus as described comprises a transportable platform array. In some embodiments, the apparatus as described is skid mounted. In some embodiments, the apparatus as described is crane mounted. Still in certain embodiments, the apparatus as described is mounted on a cargo vessel. In some embodiments, the apparatus as described is a mobile plant. In some embodiments, the apparatus as described is a fixed plant. In some embodiments, the apparatus as described is a transportable plant. Yet, the apparatus as described, in some embodiments, is a nuclear plant.

Figure 11:
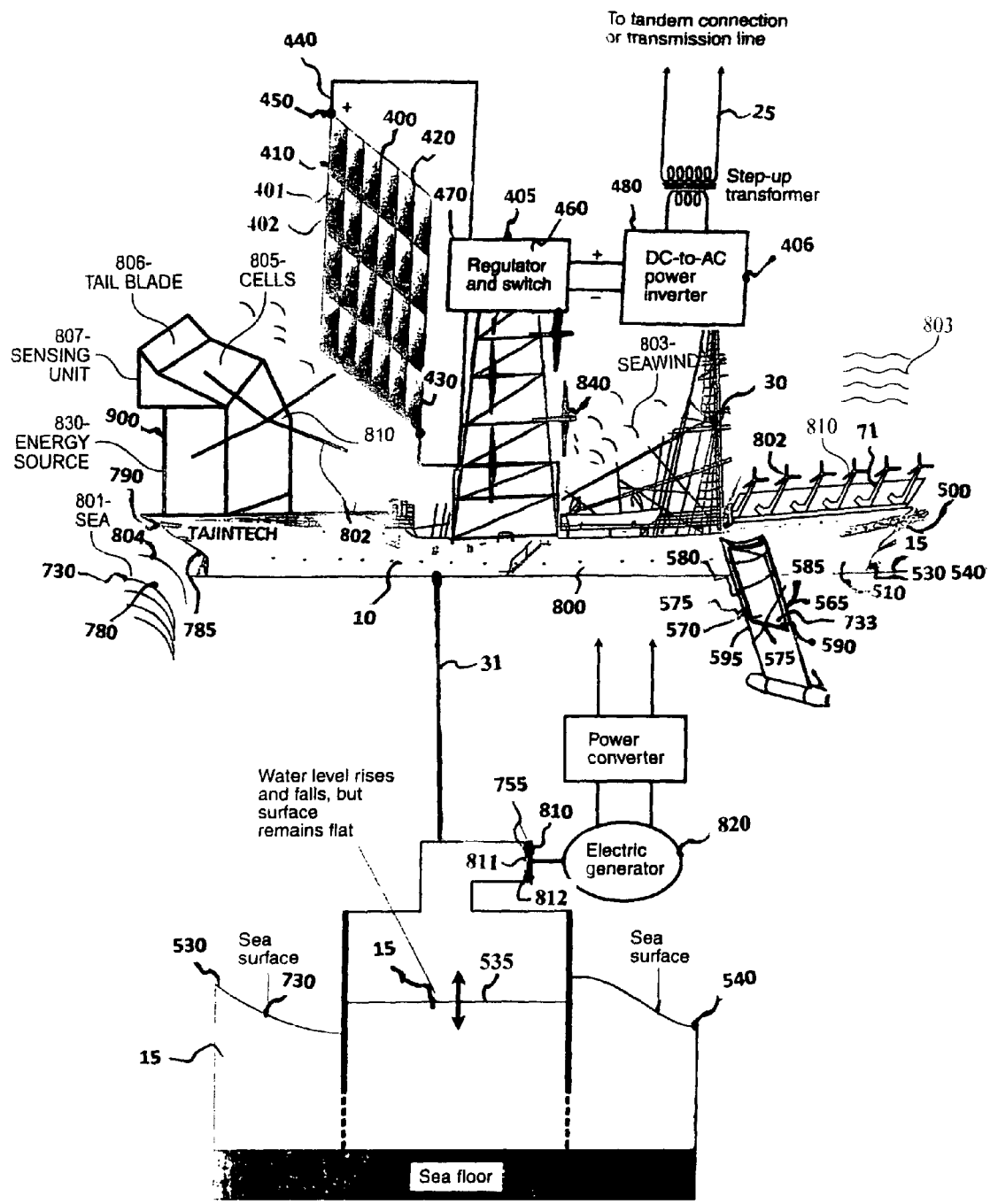
FIG. 11 is shown further exemplary description of other aspects of the embodiments comprising further devices for producing renewable electrical energy by converting ocean energy sources.

Referring to FIG. 11 is seen some exemplary embodiments of the disclosure. The teachings include the ocean 15 consisting of ocean wave 730 comprising sea surface high current area 530 and sea surface low current area 540. The seawater rises at the high current area 530 and falls at the low current area 540 leaving a flat surface 535. A turbine 810 is configured with a generator 820 for converting the wave energy into electrical energy. The abundance of energy exists in the ocean, including tide like current which could also be produced by offshore storm system. Renewable electrical energy is produced with the vessel plant where large scale persistent ocean current exist. This ocean current travels more slowly than the atmospheric wind, but because the water is denser than the air, much greater force is produced.

In some embodiments, turbine 810, 840 are placed side by side in a sequence that would result in increased energy conversion. In certain embodiments, the vessel structure 510 is responsive to tidal current frequency, turbulence and flow separation. Further application of the vessel structure 510 would increase the efficiency of the renewable energy production. In some embodiments of this disclosure, the wind and hydropower vessel plant 10 is utilized, but ocean energy sources and/or solar energy are the sole energy sources used for generating renewable electrical energy. The apparatus for harnessing these energies further comprise hydrokinetic devices 810, 840 to increase the potential to capture energy from the ocean tides 732, the ocean waves 730, the ocean wind 803, and ocean current 804. The apparatus includes, in some embodiments, further utilization of the wind and hydropower vessel plant to avail a reliable approach to the abundance of ocean energy and reduce U.S. dependence on foreign oil. The energy generated from the ocean through the wind and hydropower vessel plant 10 is renewable and causes no environmental pollution.

Some embodiments herein describe an apparatus comprising wind and hydropower vessel plant 10 operatively configured to minimize the potential environmental and navigational impacts found in conventional wind and hydropower systems. In some embodiments of this disclosure, the apparatus comprises wind and hydropower vessel plant 10 configured with unique potential to produce renewable energy, transportable energy, and to produce energy on demand.

Further design configuration include, in some embodiments, the wind turbine 810, 840 on the vessel 800 is configured to convert the kinetic energy of the wind into mechanical energy. The mechanical energy is transferred to a generator 820 by a shaft 755. The generator 820 is operatively configured to convert the mechanical energy into electrical energy which is distributed through transmission lines 25 or to grids 30. In certain embodiments, the vessel plant is skid mounted. In some embodiments, the vessel plant is submersible. In other embodiments, the vessel plant is fixed. Yet in other embodiments, the vessel plant is mobile. Still in other embodiments, the vessel plant is transportable. The vessel plant is configured with turbine 810, 840 to generate electricity for electrical grids 30, transmission lines 25, or for states that are undergoing environmental emergencies. In certain embodiments, the turbines comprise of vertical and/or horizontal axis design for downwind and upwind applications. In some embodiments of this disclosure, the wind and hydropower plant on a vessel 800 produces renewable electrical energy, hydrogen, oxygen, methane, drinking water, and salt.

In some embodiments, the turbine further comprises impulse turbine responsive to deep sea applications were the velocity of the water is much higher. The walls 790 of the vessel include runners, enabling the water to flow with acceleration after initial contacts. In other embodiments of the vessel plant 10, a submersible wing 733 is operatively configured with the vessel 800. The submersible wing 733 comprises a turbine 565 operatively configured with blades/gears 570 that are connected to shaft 575 responsive to ocean kinetic energy. The kinetic energy enables the blades/gears 570 to rotate, creating mechanical energy. The mechanical energy is transferred through the shaft 575 to generator 580. The generator 580 is responsible for converting the mechanical energy into electrical energy. The generated electrical energy is then stored in storage medium 805, 830, and 900. Some embodiments provide transmission of the electrical energy to grids 30 or to transmission lines 25.

In some embodiments, the wing 733 is retractable and submersion is only necessary for regenerative hydropower applications. Still in other embodiments, the vessel 800 is engaged in motion, initiating a relative flow force of the ocean 15 acting relative to the line of motion of the vessel 800. In certain embodiments, the relative flow force comprises drag force acting upon the blades/gears 570, whereby mechanical energy is created and transferred to the generator 580 through the shaft 575. The generator 580 is configured to convert the mechanical energy into electrical energy for storage and/or for transmission. In other embodiments, the wing configuration further includes a tapered hull 590 comprising an entrance 585 and an exit 595. Pressure or head is created at the hull 590 due the changes in the water relative to the water level outside of the hull 590. The turbine blade/gear 575 is disposed in the hull 590 and securely fastened on the shaft 575. The shaft 575 is operatively connected to the generator 580. In other embodiments, velocity of the ocean flows through the hull 590, creating rotation upon the blade/gear 570. The rotation is then transferred to the generator 580 as mechanical energy. The generator 580 then converts the mechanical energy into renewable electrical energy.

The impulse turbine, in some embodiments, includes deep sea applications. The entrance 585 at the hull 590 allows the ocean 15 to flow through the blade/gear 570 creating a rotational movement, and exiting out through the outlet 595. Yet in other embodiment of this disclosure, the turbine comprises of a reaction turbine whereby hydropower is developed from the ocean pressure and movement. The application of reaction turbines is necessary in areas of lower heads and higher ocean flow. Sill in some embodiments, the turbine comprises of kinetic turbine. The kinetic turbine is configured to generate electrical energy from kinetic energy of the ocean instead of the head energy.

The wind and hydropower vessel plant 10 include, in some embodiments, solar panels 400 comprising PV cells 402 to convert solar energy into electrical energy. The solar panels 400 are configured for converting sunlight into electrical energy. The solar panels 400, in certain embodiments, comprises at least silicon wafers 401 configured with at least a regulator switch 405 operatively connected to a DC to AC converter 406 deployed with the vessel 10. In some embodiments, the DC to AC converter further comprises an inverter operatively connected to a transformer. The DC to AC converter 406, in other embodiments, further comprises a transformer configured for converting the voltage into alternating current. A transmission line 25 and a grid source 30 are operatively connected to the converter 406. Still in some embodiments, the reflective rays from the sun's heat against the surface of the ocean are attracted by the PV cells 402. The PV cells 402, in certain embodiments, are configured with the solar panel 400 for producing renewable electrical energy. In other embodiments, the PV cells 402 are connected to modules 410 comprising panels 420 and arrays 430.

In some embodiments, the PV cells 402 are disposed on turn-able mounts 440 comprising swivel joints 450. In certain embodiments, a controller 460 is operatively configured with the PV cells 402 and PV mounts 440. The controller 460, in some embodiments, turns the mounts 440 responsive to the direction of the sun. The controller 460 includes, in some embodiments, a computerized mechanical system 470 operatively connected to the swivel joints 450 and/or a bearing. The PV cells 402 are operatively configured with inverters/transformers 480 that are disposed with the vessel plant 10. The inverters/transformers 480, in some embodiments, are configured to be connected to electricity grids 30 or transmission lines 25 for power distributions. Still some embodiments of this disclosure, the vessel plant further comprise a device for converting ocean wave, ocean current, and ocean tide into renewable electrical energy. In the later teaching, the turbine 810 rotates as air 811 is pumped in and out of a hole 812. The resulting mechanical torque due to the force of the air 811 drives the electric generator, which is configured to convert the mechanical torque into electrical energy. The air is created as the wave 730 falls from high elevation 530 to low elevation 540.

Figure 12:
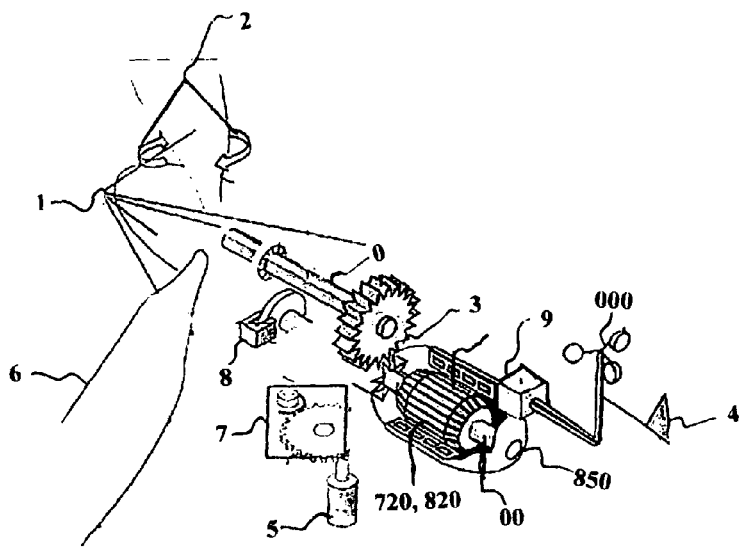
FIG. 12 is seen further exemplary description of a standard turbine configuration for some embodiments of the disclosure.

Referring to FIG. 12 is seen further exemplary embodiments a turbine configuration. In some embodiments of the disclosure, the wind and hydropower vessel plant 10 is configured for producing renewable energy. The vessel plant 10 include, in certain embodiments, standard turbine design configuration, comprising an anemometer 000 responsive to wind speed. A high speed shaft 00 operatively configured with a generator 720, 820. The generator 720, 820 is responsible for generating electrical energy. Some embodiments of the disclosure include a rotor 1 comprising at least a blade 6 and/or a hub operatively configured with a pitch 2. The pitch 2 is responsive to the wind and responsible for the speed of the rotor 1. A low speed shaft 0 is operatively configured with the rotor 1.

The low speed shaft 0, in some embodiments, is responsive to the rotor's operation. A gear box 3 is communicatively connected to the generator 720, 820 through the low speed shaft 0. In certain embodiments, the generator 720, 820 is configured with the high speed shaft 00. A controller 9 is responsible for the operation of the turbine. Still, some embodiments of this disclosure further include the controller 9 responsive to the wind speed. The controller 9 is operatively configured to operate the turbine at a prescribed wind speed value. A nacelle 850, in certain embodiments, is operatively configured with the turbine 810, 840. The nacelle 850, in some embodiments, is further disposed with a tower and comprises the gear box 3, the low speed shaft 0, the high speed shaft 00, the brake 8, the controller 9, and the generator 720, 820. Some embodiments herein further describe a yaw drive 7 operatively configured with the rotor 1. The rotor is further connected to the brake 8, which may be operated either through a hydraulic, mechanical, or electrical means. The yaw drive 7 is responsible for directing the rotor 1 towards the direction of the wind. In some embodiments, the yaw drive 7 is communicatively connected to a wind vane 4 responsible for measuring wind direction and for turning the turbine with respect to the wind. The yaw drive 7 is responsive to the operation of a yaw motor 5.

Since no fuel-oil is used in the disclosed embodiments, the application of these embodiments would reduce greenhouse gases caused by the use of fuel, diesel, or other types of fuel. Some embodiments provide wind and hydropower vessel plant, which configured for producing electrical energy without producing any nitrogen, carbon dioxide, and water vapor as seen in other types of power plants. The wind and hydropower vessel plant 10 is relatively easy to operate and maintain. The vessel 800 would be utilized by States with natural emergencies because the energy is transportable and could be produced on demand. Yet, another benefit includes reducing U.S. dependence on fossil fuels and foreign oil. Oil use in vehicles is a non-renewable resource and burning fossil fuels would further generate greenhouse gas emission and other pollutants.

In some embodiments, the wind and hydropower vessel plant would:

Reduce greenhouse gas "GHG" emissions.
Improve worldwide air quality and reduce petroleum consumption by more than 8 million barrels per day.
Reduce global warming and other emissions through wide-scale applications of the embodiments over time.
Reduce the need for research and development dollars associated with building dams.
Reduce U.S. dependence on imported oil.
Reduce smog caused by emissions of nitrogen oxides and carbon monoxide emissions.
Contributes significantly to the national effort to reduce greenhouse gas emissions.

Figure 13:
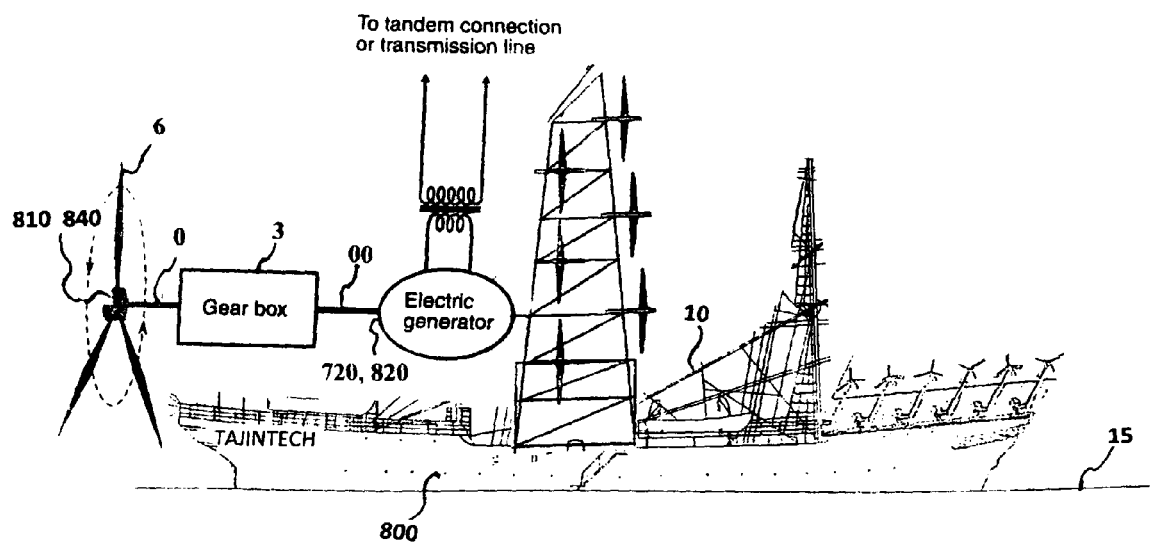
FIG. 13 is seen further extension of other aspects of the embodiments including the turbine configuration with the vessel plant.

Referring to FIG. 13 is seen further exemplary embodiments of the turbine. In other embodiments, the turbine comprises a gear box 3. In certain embodiments, the gear box 3 comprises wind and hydropower vessel plant 10 configured with turbine 810, 840. In some embodiments, the turbine 810, 840 comprise the gear box 3 which is disposed for vertical or horizontal rotation with the vessel 800. Some embodiments of the vessel 800 includes the vessel plant 10 positioned disposed on the ocean 15. In some embodiments of the disclosure, the vessel plant 10 further comprises an island. In other embodiments, the island is configured with strategic submersible gearboxes that are configured with sluice gates that are opened to allow wave and water to flow through. The speed of the gears in the gearbox 3, in some embodiments, is responsive to at least one of: the force of the wind, the ocean current, the tidal energy, or the flow force of the ocean wave.

Yet, some embodiments further include the low speed shaft 0 configured with the rotor 1, which comprises of the blade 6. The blade 6 is operatively connected to the gearbox 3. Still, in some embodiments, the low rotational speed of the shaft 0 is translated into high rotational speed through the configuration of the gear box 3. The high rotational speed is communicated to the generator 720, 820 through the high speed shaft 00. Some embodiments include the turbine configured for regenerative hydropower. In this disclosure, where the ocean current is low or the flow force of the wave is low, engaging the vessel 800 in motion would generate a drag force which would act upon the blade. In some embodiments, the vessel is propelled by at least one of: an electrical motor, electrical/internal combustion engine, an internal combustion engine.

In certain embodiments, the hydropower is regenerated when the vessel engages in motion. Still in other embodiment, the vessel is configured with turbines. Yet, in some embodiments, each of the turbines is configured for specific operations, including operations in the ocean 15 and/or out of the ocean. Additionally, low current or wind force is compensated by the movement of the vessel. In certain embodiments, the vessel plant 10 attracts the force of the wind and the force of the seawater. In other embodiments, the attractions are responsive to the energy contained within the wind and/or the ocean for producing of at least one of: electrical energy, hydrogen, desalinated water, oxygen, methane, and salt.

Figure 14:
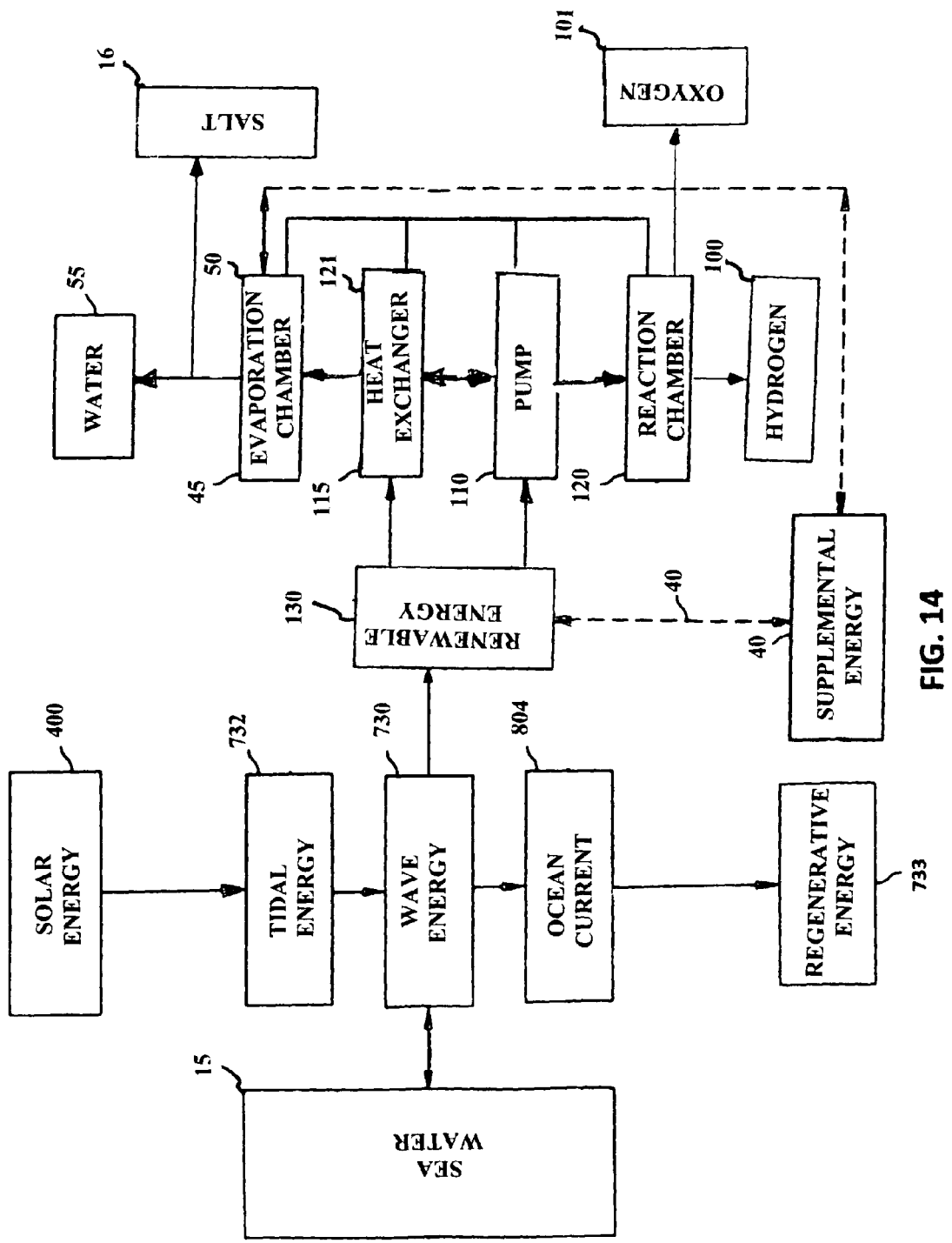
FIG. 14 is shown further exemplary description of other aspects of the embodiments of the disclosures.

Referring to FIG. 14 is seen an exemplary embodiments of the disclosure of the platform configuration for harvesting the abundance of ocean energies. In certain embodiments, the platform is disposed on the ocean 15 for harvesting solar energy 400, tidal energy 732, wave energy 730, and ocean energy 730. In some embodiments, these energies are converted into renewable energy 130. Some embodiments of the disclosure further include regenerative energy apparatus 733. In other embodiments, the renewable energy 130 is configured to empower a heat exchanger 115 and a suction pump 110. The suction pump 110 and the heat exchanger are operatively configured with the evaporation chamber 45 and the reaction chamber 120. A condenser chamber 50 is configured with the evaporation chamber. The evaporation chamber is further configured for generating vapor to empower a turbine for generating supplemental energy 40. The vapor is condensed at the condenser chamber and desalinated water 55 and salt 16 are produced. The reaction chamber 120, in some embodiments, is configured for producing hydrogen 100 and oxygen 101.

Figure 15:
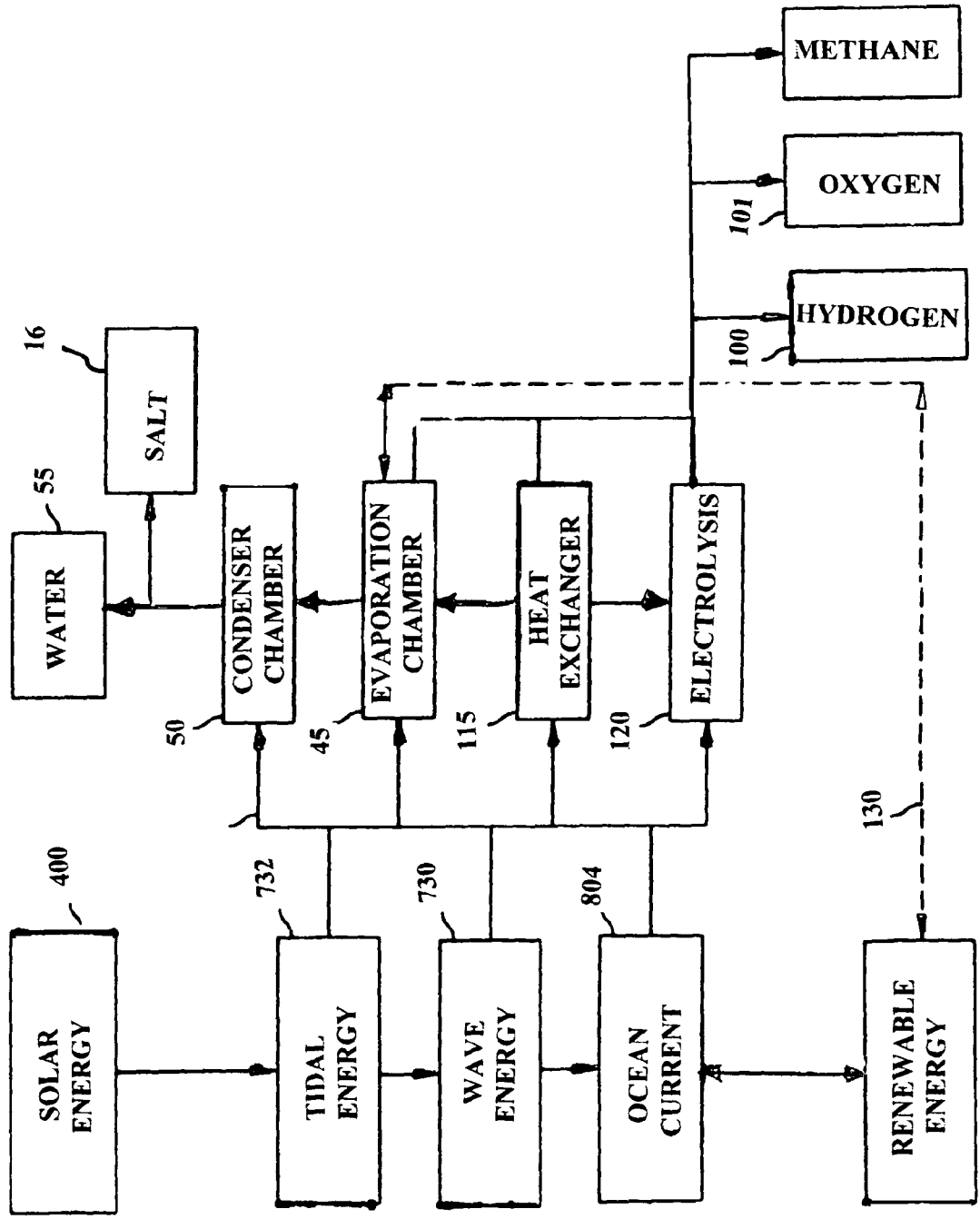
FIG. 15 is shown further exemplary description of other aspects of the embodiments of the disclosures.

Referring to FIG. 15 is seen further exemplary embodiments of the disclosure of the platform configuration for harvesting the abundance of ocean energies. In certain embodiments, the platform is disposed on the ocean 15 for harvesting solar energy 400, tidal energy 732, wave energy 730, and ocean energy 730. In some embodiments, these energies are converted into renewable energy 130. Some embodiments of the disclosure further include regenerative energy apparatus 733. In other embodiments, the renewable energy 130 is configured to empower a heat exchanger 115 and a suction pump 110. The suction pump 110 and the heat exchanger are operatively configured with the evaporation chamber 45 and the reaction chamber 120. The reaction chamber further comprises electrolysis. A condenser chamber 50 is configured with the evaporation chamber. The evaporation chamber is further configured for generating vapor to empower a turbine for generating supplemental energy 40. The vapor is condensed at the condenser chamber and desalinated water 55 and salt 16 are produced. The reaction chamber 120, in some embodiments, is configured for producing hydrogen 100, oxygen 101, and methane.

Figure 16:
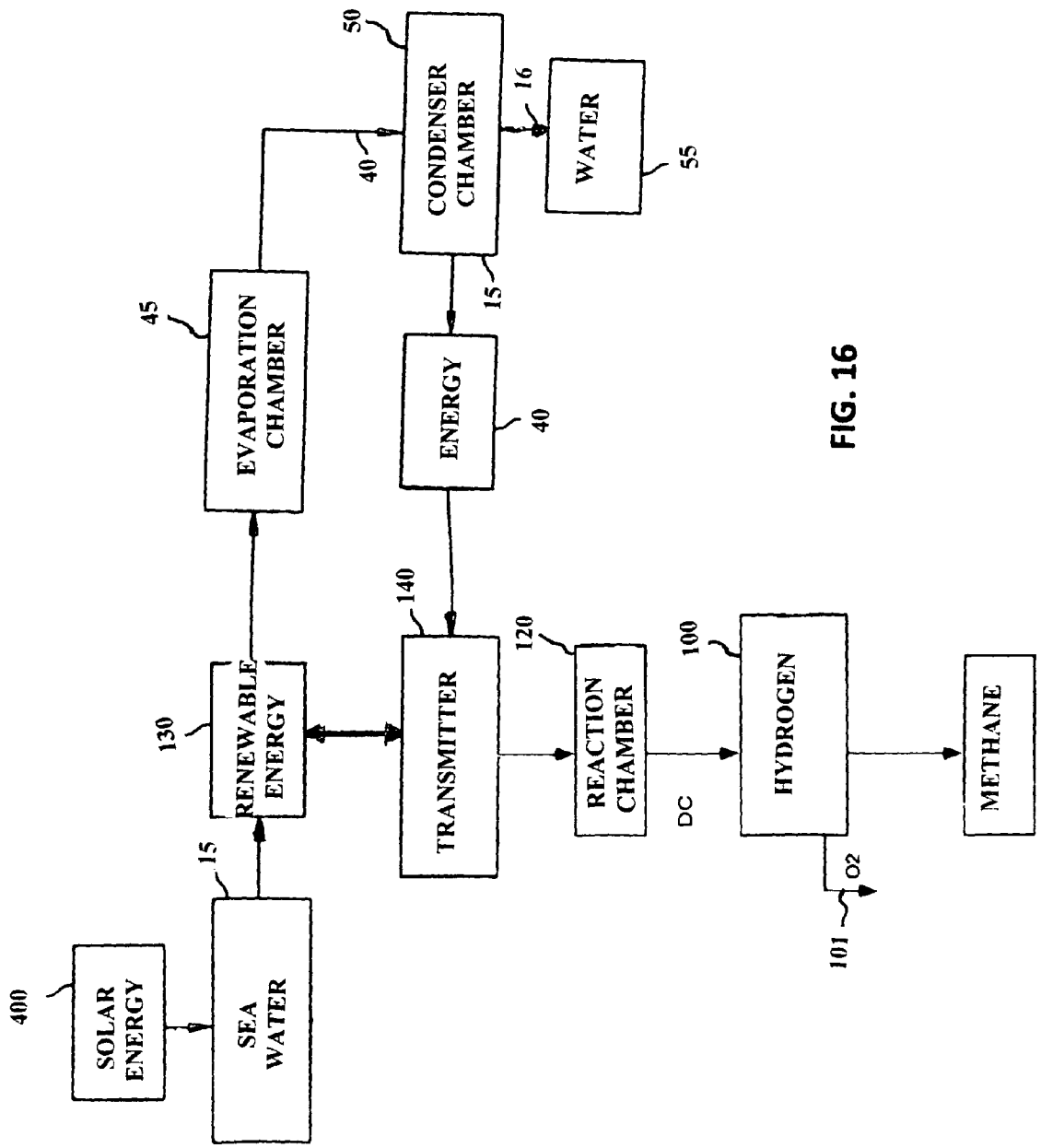
FIG. 16 is shown further exemplary description of other aspects of the embodiments of the disclosures.

Referring to FIG. 16 is seen further exemplary embodiments of the disclosure of the platform configuration for harvesting the abundance of ocean energies. In certain embodiments, the platform is disposed on the ocean 15 for harvesting solar energy 400, tidal energy, wave energy, and ocean energy. In other embodiments, the reflective rays of the solar energy against the surface of the ocean 15 are absorbed by the solar energy apparatus 400. In some embodiments, these energies are converted into renewable energy 130. Some embodiments of the disclosure further include a transmitter 140 operatively configured with the renewable energy 130 and communicatively connected to the reaction chamber 120. In other embodiments, the renewable energy 130 is configured to empower a heat exchanger and a suction pump. The suction pump and the heat exchanger are operatively configured with the evaporation chamber 45 and the reaction chamber 120. The reaction chamber further comprises electrolysis. A condenser chamber 50 is configured with the evaporation chamber. The evaporation chamber is further configured for generating vapor to empower a turbine for generating supplemental energy 40. The vapor is condensed at the condenser chamber and desalinated water 55 and salt 16 are produced. The reaction chamber 120, in some embodiments, is configured for producing hydrogen 100, oxygen 101, and methane.

Figure 17:
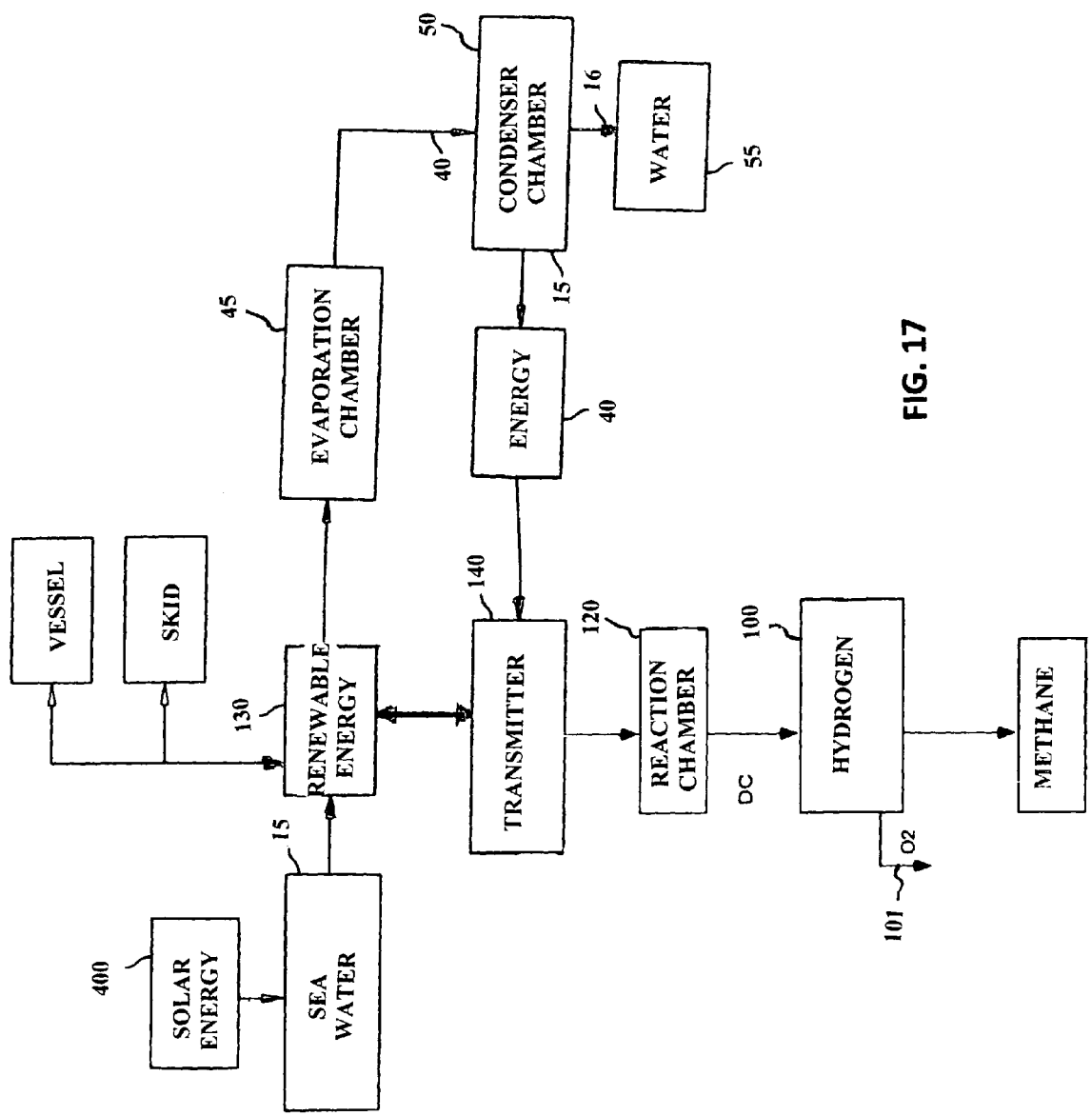
FIG. 17 is shown further exemplary description of other aspects of the embodiments of the disclosures.

Referring to FIG. 17 is seen further exemplary embodiments of the disclosure of the platform configuration to be mounted on a skid. In some embodiments, the skid is mounted on a cargo vessel to be transported to prescribed and/or predetermined location. In certain embodiments, the platform is configured for harvesting the abundance of ocean energies. In certain embodiments, the platform is disposed on the ocean 15 for harvesting solar energy 400, tidal energy, wave energy, and ocean energy. In other embodiments, the reflective rays of the solar energy against the surface of the ocean 15 are absorbed by the solar energy apparatus 400. In some embodiments, these energies are converted into renewable energy 130. Some embodiments of the disclosure further include a transmitter 140 operatively configured with the renewable energy 130 and communicatively connected to the reaction chamber 120. In other embodiments, the renewable energy 130 is configured to empower a heat exchanger and a suction pump. The suction pump and the heat exchanger are operatively configured with the evaporation chamber 45 and the reaction chamber 120. The reaction chamber further comprises electrolysis. A condenser chamber 50 is configured with the evaporation chamber. The evaporation chamber is further configured for generating vapor to empower a turbine for generating supplemental energy 40. The vapor is condensed at the condenser chamber and desalinated water 55 and salt 16 are produced. The reaction chamber 120, in some embodiments, is configured for producing hydrogen 100, oxygen 101, and methane.

Figure 18:
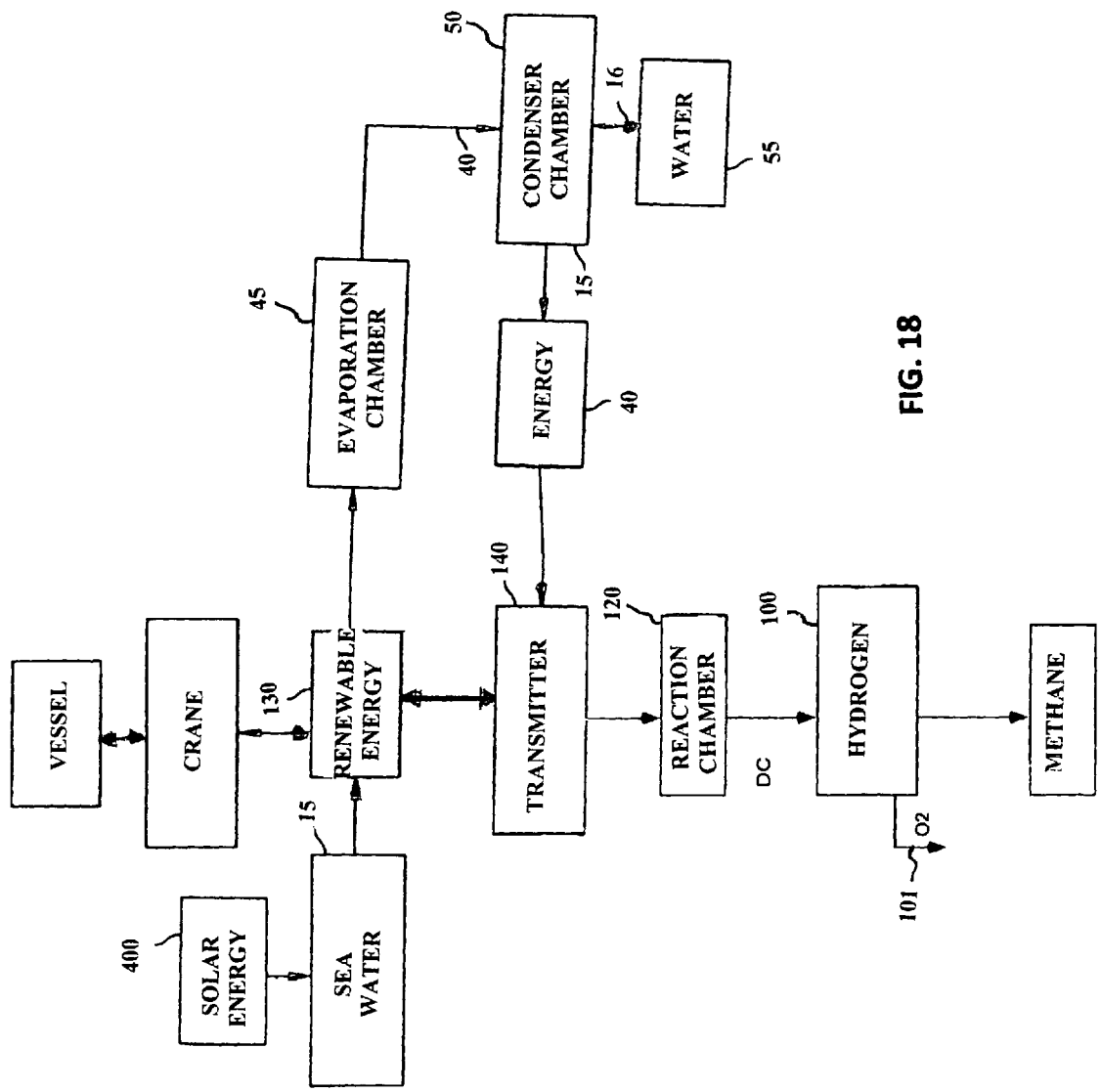

Referring to FIG. 18 is seen further exemplary embodiments of the disclosure of the platform configuration to be mounted with a crane on a vessel. In some embodiments, the crane is mounted on a vessel configured with the platform as disclosed. In certain embodiments, the platform is loaded on a vessel by at least a crane. In some embodiments, the crane is mounted on the platform. In other embodiments, the crane is disposed on a vessel configured for loading and offloading the platform. In certain embodiments, the platform is disposed on the ocean by the crane. In other embodiments, the platform is loaded and/or offloaded on the vessel with the crane. Yet in other embodiments, the platform is submersible. Still in some embodiments, the platform is fixed. Some embodiments of the disclosure include the platform further loaded on a vessel for transportation to a prescribed and/or a predetermined location.

In certain embodiments, the platform is configured for harvesting the abundance of ocean energies. In certain embodiments, the platform is disposed on the ocean 15 for harvesting solar energy 400, tidal energy, wave energy, and ocean energy. In other embodiments, the reflective rays of the solar energy against the surface of the ocean 15 are absorbed by the solar energy apparatus 400. In some embodiments, these energies are converted into renewable energy 130. Some embodiments of the disclosure further include a transmitter 140 operatively configured with the renewable energy 130 and communicatively connected to the reaction chamber 120. In other embodiments, the renewable energy 130 is configured to empower a heat exchanger and a suction pump. The suction pump and the heat exchanger are operatively configured with the evaporation chamber 45 and the reaction chamber 120. The reaction chamber further comprises electrolysis. A condenser chamber 50 is configured with the evaporation chamber. The evaporation chamber is further configured for generating vapor to empower a turbine for generating supplemental energy 40. The vapor is condensed at the condenser chamber and desalinated water 55 and salt 16 are produced. The reaction chamber 120, in some embodiments, is configured for producing hydrogen 100, oxygen 101, and methane.

While certain aspects and embodiments of the disclosure have been described, these have been presented by way of example only, and are not intended to limit the scope of the disclosure. Indeed, the novel of the apparatus described herein may be embodied in a variety of other forms without departing from the spirit thereof. The accompanying claims and their equivalents are intended to cover such forms or modifications as would fall within the scope and spirit of the disclosure.

What is claimed:

1. A hybrid vessel comprising a wind and hydropower vessel plant for producing renewable energy; comprising:
   a. at least a housing assembly disposed with at least a turbine apparatus;
   b. at least a generator apparatus affixed in said housing assembly, in communication with said turbine apparatus;
   c. at least a vessel apparatus disposed with said housing assembly;
   d. at least an energy cell apparatus in communication with said generator apparatus, said generator apparatus further comprising energy generation mechanism;
   e. said turbine apparatus further disposed with means for communication with fluid passage;
   f. said vessel apparatus further disposed with at least a structure comprising at least one of: an outer wall; a side wall; a vertical wall; a horizontal wall; a moveable wall; a flexible wall; a rigid wall; an angular wall; at least an energy plant comprising at least one of: electricity generation plant; desalination plant: fuel plant: hydrogen plant; oxygen plant: salt plant; methane plant.

2. A hybrid wind and hydropower vessel plant of claim 1, wherein said turbine apparatus responsive to at least a form of energy comprising at least one of: converting fluid pressure/force into kinetic energy; converting kinetic energy into mechanical energy; and wherein said generator apparatus further converting said mechanical energy into renewable electrical energy.

3. A hybrid wind and hydropower vessel plant of claim 1, wherein said generator apparatus further responsive to at least a torque in association to a propulsive force from said turbine apparatus operation.

4. A hybrid wind and hydropower vessel plant of claim 1, wherein said generator apparatus coupled to said turbine apparatus and disposed with said housing assembly on said vessel apparatus for converting fluid pressure and/or force into renewable electrical energy.

5. A hybrid wind and hydropower vessel plant of claim 1, wherein said vessel apparatus further comprising at least a platform for renewable energy generation.

6. A hybrid wind and hydropower vessel plant of claim 5, wherein said platform operatively configured for at least one of: generating at least energy; harvesting energy; producing energy; and storing at least energy.

7. A hybrid, wind and hydropower vessel plant of claim 2, wherein said form of energy further comprises at least one of: wind energy; ocean current; tidal energy; wave energy.

8. A hybrid wind and hydropower vessel plant of claim 1, wherein said generator apparatus further comprises generator assembly outputly in association with at least a thermal apparatus for producing at least a form of energy comprising at least one of: steam; desalination; fuel; electrical energy; water; hydrogen; methane; salt; oxygen.

9. A hybrid wind and hydropower vessel plant of claim 1, wherein said vessel apparatus further comprises at least a floating means comprising at least one of: at least a ship; at least a water craft; at least a vessel; at least a hull; means for mooring at least a hull to at least an offshore location.

10. A hybrid wind and hydropower vessel plant of claim 1, wherein at least one turbine apparatus is in association at least one generator apparatus, each being coupled to at least one housing assembly and disposed with said hull.

11. A hybrid wind and hydropower vessel plant of claim 1, wherein said energy cell apparatus further comprising means for storing and/or for generation of renewable energy; further comprising at least one of at least an ultra capacitor; at least a transformer; at least a battery bank; at least a grid ready inverter; at least a solar cell apparatus; at least an electrical circuit; further comprising a thermal apparatus in communication with said energy cell apparatus for generation of at least one on steam; energy; desalination; methane; hydrogen; oxygen; salt; and fuel.

12. A hybrid wind and hydropower vessel plant of claim 5, wherein said platform further comprises arrays of apparatus for generating renewable energy.

13. A hybrid wind and hydropower vessel plant of claim 5, wherein said platform further configured with means for adjusting said hull relative to at least one of: wave motion; wind direction; ocean current flow-direction.

14. A hybrid wind and hydropower vessel plant of claim 5, wherein said platform further comprises at least one of: is skid mounted; is affixed on said vessel apparatus.

15. A hybrid wind and hydropower vessel plant of claim 1, wherein said vessel apparatus further comprises at least a crane mounted platform, and wherein said platform being affixed with said thermal apparatus in communication with said energy cell apparatus for generation of at least one of: steam; renewable energy; desalination; methane; hydrogen; oxygen; salt; and fuel.

16. A hybrid wind and hydropower vessel plant of claim 1, wherein said vessel apparatus further comprises at least a transportable platform.

17. A hybrid wind and hydropower vessel plant of claim 1, wherein said vessel apparatus further comprises means for producing said at least one form of energy on demand.

18. A hybrid wind and hydropower vessel plant of claim 1, wherein said vessel apparatus further comprises at least a mobile platform.

19. A hybrid wind and hydropower vessel plant of claim 1, wherein said vessel apparatus further comprises at least a fixed platform.

20. A hybrid wind and hydropower vessel plant of claim 1, wherein said vessel apparatus further comprises at least a submersible platform.

21. A hybrid wind and hydropower vessel plant of claim 1, wherein said vessel apparatus further comprises a deliverable platform configured to be delivered by at least a vessel means.

22. A hybrid wind and hydropower vessel plant of claim 5, wherein said platform further comprises at least a nuclear power plant.

23. A hybrid wind and hydropower vessel plant of claim 5, wherein said platform further comprises at least a plant configured for producing at least one of: electrical energy, hydrogen, oxygen, steam, methane, desalinated water, fuel, and/or salt.

24. A hybrid wind and hydropower vessel plant of claim 5, wherein said platform further comprises at least an energy plant.

25. A hybrid wind and hydropower vessel plant of claim 1, wherein said vessel apparatus comprising at least an energy plant, further comprises at least one of: a solar energy plant; electrical energy plant; enclosed wind turbine plant; renewable energy plant; a mobile energy plant, a transportable energy plant; a fixed energy plant; fuel plant; desalination plant; hydrogen plant; oxygen plant; salt plant; methane plant.

26. A hybrid wind and hydropower vessel plant of claim 5, wherein said platform further comprises at least an island.

27. A hybrid wind and hydropower vessel plant of claim 9, wherein said hull further comprises means fur harvesting electrical energy.

28. A hybrid wind and hydropower vessel plant of claim 9, wherein said hull further comprises an energy generation apparatus in association with at least one of: a water tank; at least a ballast tank; at least a ballast water chamber operable to cause resonance.

29. A hybrid wind and hydropower vessel plant of claim 1, wherein said vessel apparatus further comprises at least an oscillating water column in association with said housing assembly, wherein said turbine apparatus responsive to said at least one form of energy for producing mechanical energy, and wherein said generator apparatus responsive to said mechanical energy for generation of electrical energy.

30. A hybrid wind and hydropower vessel plant of claim 1, wherein said vessel apparatus further disposed with means responsive to water swells for increasing production of electrical energy.

31. A hybrid wind and hydropower vessel plant of claim 9, wherein said hull further comprises at least one of at least an anchor; at least an adjustable guide; at least a retractable guide; a floatable guide; a retractable turbine; a submersible opened-end chamber in association with at least one of: a fluid entrance channel, a fluid exit channel; at least a suspend-able device; at least an oscillating water column; at least a ballast water chamber.

32. A hybrid wind and hydropower plant of claim 1, wherein said vessel apparatus further comprises at least an energy conversion means in association with at least one of: an oscillating water column; an oscillating water chamber; a ballast water chamber.

33. A hybrid wind and hydropower plant of claim 1, wherein said generator apparatus further disposed with a housing assembly; said housing assembly further comprising at least a submersible opened-end chamber.

34. A hybrid wind and hydropower plant of claim 33, wherein said submersible opened-end chamber further comprises at least one of: at least a fluid entrance channel; at least a fluid exit channel.

35. A hybrid wind and hydropower plant of claim 1, wherein said housing assembly further comprising an energy conversion means, where in said energy conversion means further comprises at least one of: at least a retractable device; at least an extendable device; at least an anchor means; at least a suspend-able device; at least a floatable device; at least a partially floatable device; at least a pull-able device; at least a drag-able device; at least a regenerative energy device; at least a compressible device; at least a hollow extrusion device; at least a structural means configured with at least an aerofoil cross section; at least an adjustable mooring link in association with at least a hull; means for converting kinetic energy in fluid into mechanical energy; means for converting said mechanical energy into electrical energy.

36. A hybrid wind and hydropower plant of claim 7, wherein said wave energy further comprises at least one of an oscillating water column; a float water column; a channel water column.

37. A hybrid vessel comprising wind and hydropower vessel plant for energy generation and for desalination; comprising: at least a housing assembly; at least a turbine apparatus is disposed with said housing assembly; at least a generator apparatus affixed in said housing assembly and responsive to said turbine apparatus operation; at least an energy cell apparatus in communication with said generator apparatus; at least a vessel apparatus disposed with said housing assembly; said vessel apparatus being disposed with at least a structure comprising at least one of an outer wall; a side wall; a vertical wall; a horizontal wall; a moveable wall; a flexible wall; a rigid wall; an angular wall, and said structure further affixed with at least one of: at least an electrolytic chamber; at least a thermal apparatus in association with said electrolytic chamber, and communicatively connected to at least one of: said energy cell apparatus; at least an electrical circuit.

38. A hybrid wind and hydropower vessel plant of claim 37, wherein said thermal apparatus in communication with said electrolytic chamber; said electrolytic chamber further comprises at least an anode and at least a cathode.

39. A hybrid wind and hydropower vessel plant of claim 38, wherein said anode further comprises at least a first alloyed material and said cathode further comprises at least a second alloyed material; wherein said first and second alloyed material is not limited to any one of: magnesium alloy; aluminum alloy.

40. A hybrid wind and hydropower vessel plant of claim 38, wherein said anode further comprises means for producing hydrogen and said cathode further comprises means for producing oxygen.

41. A hybrid wind and hydropower vessel plant of claim 37, wherein said turbine apparatus further configured with at least one of: at least a blade; at least a wheel; each radially positioned for at least one of: to be rotatable in communication with said generator apparatus; foldable on a vertically and/or horizontally plane in fluid communication, and outwardly of at least a shaft for communication with said generator apparatus.

42. A hybrid wind and hydropower vessel plant of claim 37 wherein said turbine apparatus further comprises at least one of a vertical axis turbine; a horizontal axis turbine.

43. A hybrid wind and hydropower vessel plant of claim 37 wherein said turbine apparatus further disposed with at least one of: at least a tower; at least a ring gear; at least a blade; at least a mooring line gear; at least a radial arm; at least a braking means; at least a cable means; at least a torque portion; at least an air-foiled surface; at least a fluid-foiled surface; and wherein at least a wire harness is coupled to said generator apparatus for communications with said energy cell apparatus.

44. A hybrid wind and hydropower vessel plant of claim 37, further comprising at least a hull configured with at least a housing comprising at least one of: at least a desalination plant; at least electrical energy plant; at least hydrogen production plant; at least nuclear power plant; at least methane plant; at least salt production plant; at least fuel production plant, at least oxygen plant.

45. A hybrid wind and hydropower vessel plant of claim 37, wherein said vessel apparatus further comprises means for harvesting renewable electrical energy via at least one of wind flow; water current; tidal energy; wave energy; solar energy; thermal energy.

46. A hybrid wind and hydropower vessel plant of claim 37, wherein said vessel apparatus further configured with at least one of: said electrolytic chamber; said thermal apparatus; in communication with at least one of: said electrical circuit; said energy cell apparatus; for generation of at least one of: steam; energy; desalination; methane; hydrogen; oxygen; salt; and fuel; further comprises means for varying the orientation of said hull relative to at least one of: wave motion; water current; wind direction.

47. A hybrid wind and hydropower vessel plant of claim 37, wherein said thermal apparatus thither disposed with said vessel apparatus; comprising at least one of: a water intake system comprising a water intake in communication with a body of water in communication with at least a pump means; a water desalination system configured with at least an electrical means to produce desalinated water responsive to at least a water drawn from the body of water; a tank on the vessel apparatus configured to mix at least a concentrate with at least the water drawn from the body of water to produce diluted concentrate; at least a concentrate discharge system configured to discharge the diluted concentrate into the body of water.

48. A hybrid wind and hydropower vessel plant of claim 37, wherein said vessel apparatus further comprising means for storing energy and water; comprising at least one of: providing said turbine apparatus in communication with said generator apparatus that generates electrical power by converting mechanical power in response to wind energy; providing solar cells that are mounted on said vessel apparatus; providing at least one electrical circuit that is configured for communication with at least an electrical power source for enabling at least one of: desalination; hydrogen production; methane production; salt production; oxygen production; fuel production; energy production; using said electrical power source for purification to provide a source of purified drinking water; storing said purified drinking water in a tank on said vessel apparatus; storing said purified drinking water in a tank on at least a vessel means; processing said purified drinking water for commercial application in at least a container.

49. A hybrid wind and hydropower vessel plant of claim 37, wherein said vessel apparatus further configured with said energy cell apparatus for storing energy; comprising: storing electrical power in at least one of: cells; capacitors; transformers; batteries for later use; using said electrical power to perform thermal operations in association with said electrolytic chamber for generation of at least one of: electrical energy; hydrogen; oxygen; methane; salt; desalinated water; fuel; using said hydrogen and oxygen in a fuel cell to further generate electrical power.

50. A hybrid wind and hydropower vessel plant of claim 37, wherein said vessel apparatus further comprising a floating platform for generating hydrogen; comprising at least one of: feed water; a heat loop comprising at least a recirculated heat transfer medium; a steam generator connected to at least one of: said heat loop, said heat transfer medium, and said feed water; said steam generator being operable for raising the temperature of said feed water; wherein said feed water is coupled to at least a water cracking system by said feed water input line; and wherein said feed water input line is in flow communication with said steam generator and said water cracking system.

51. A hybrid wind and hydropower vessel plant of claim 37, wherein said vessel apparatus further comprises at least one of an intake port; a desalination plant; a water clean-up system; a steam turbine; a steam turbine condenser; a discharge port; an energy plant.

52. A hybrid wind and hydropower vessel plant of claim 37, wherein said turbine apparatus is thither configured with means for communication with fluid passage.

53. A hybrid wind and hydropower vessel plant of claim 37, wherein said turbine apparatus further configured for converting rotational motion into mechanical power, said generator apparatus operable for converting said mechanical power into electrical energy.

54. A hybrid wind and hydropower vessel plant of claim 52, wherein said means for communication with fluid passage further comprises at least one of: an anchor; a blade; a wheel, an armature; a hub; a mechanical device; a thrust device; a propulsive device; a ballast.

55. A hybrid vessel comprising wind and hydropower vessel plant for energy generation and for desalination; comprising: at least a housing; at least a turbine apparatus disposed with said housing; at least a generator apparatus in association with said turbine apparatus; at least a vessel apparatus disposed with said housing assembly; at least an energy cell apparatus communicatively connected to said generator apparatus; said vessel apparatus being further disposed with at least a wall comprising at least one of an outer wall; a side wall; a vertical wall; a horizontal wall; a moveable wall; a flexible wall; a rigid wall; an angular wall; at least a tank is affixed on said at least one wall; at least an intake port is affixed with said at least one wall; at least a thermal apparatus, said thermal apparatus in communication with said generator apparatus; said at least one wall in association with at least a discharge port.

56. A hybrid vessel comprising wind and hydropower vessel plant; comprising: at least a vessel apparatus being configured with at least a structure comprising at least one of: an outer wall; a side wall; a vertical wall; a horizontal wall; an angular wall; a flexible wall; a rigid wall; wherein at least one wall causes movements with wave motion; at least a housing assembly is affixed on said structure; at least a turbine apparatus is disposed with said housing assembly, in communication with at least a fluid body; at least a generator apparatus is coupled to said turbine apparatus for generation of electrical energy; at least an energy cell apparatus in communication with said generator apparatus.

57. A hybrid vessel comprising wind and hydropower vessel plant; comprising: at least a vessel apparatus being configured with at least a structure comprising at least one of: a lower end; a middle end; an upper end; a mobile end, a submersible end; a transportable end; a flexible end; a rigid end; each said end comprising at least one of: an anchor; an alliance; an alignment; an affiliation; an axis; a ballast; a ballast water tank; a tank; a chamber; an oscillating water column; a water swell; in association with at least a hull; at least a housing assembly is further affixed on said structure; at least a turbine apparatus is disposed with said housing assembly, in communication with at least a fluid body; at least a generator apparatus is coupled to said turbine apparatus for generation of electrical energy: at least an energy cell apparatus in communication with said generator apparatus; said structure further comprises at least one of: an outer wall; a side wall; a vertical wall; a horizontal wall; a moveable wall; a flexible wall; a rigid wall; an angular wall; at least an energy plant comprising at least one of: electricity generation plant; desalination plant; fuel plant; hydrogen plant; oxygen plant; salt plant; methane plant.

58. A hybrid vessel comprising wind and hydropower vessel plant; comprising: at least a vessel apparatus comprising a floating means; said floating means further comprises at least one of: at least a cross flow water turbine apparatus; at least a ship; at least a water craft; at least a vessel; at least a hull;

means for mooring at least a hull to at least an offshore location; at least a generator apparatus in communication with said turbine apparatus; at least an energy cell apparatus in communication with said generator apparatus; said vessel apparatus further disposed with at least a structure comprising at least one of: an outer wall; a side wall; a vertical wall; a horizontal wall; a moveable wall; a flexible wall; a rigid wall; an angular wall; at least an energy plant comprising at least one of: electricity generation plant; desalination plant; fuel plant; hydrogen plant; oxygen plant; salt plant; methane plant.

* * * * *